(12) United States Patent
Wood et al.

(10) Patent No.: US 7,654,728 B2
(45) Date of Patent: Feb. 2, 2010

(54) SYSTEM AND METHOD FOR THERAPEUTIC APPLICATION OF DISSOLVED OXYGEN

(75) Inventors: Anthony B. Wood, Dallas, TX (US); Gregory J. Archambeau, Puyallap, WA (US); Richard A. Klena, Meridian, ID (US)

(73) Assignee: Revalesio Corporation, Tacoma, WA (US)

( * ) Notice: Subject to any disclaimer, the term of this patent is extended or adjusted under 35 U.S.C. 154(b) by 159 days.

(21) Appl. No.: 10/877,106

(22) Filed: Jun. 25, 2004

(65) Prior Publication Data

US 2005/0047270 A1 Mar. 3, 2005

Related U.S. Application Data

(63) Continuation-in-part of application No. 10/796,583, filed on Mar. 9, 2004, now Pat. No. 6,974,546, which is a continuation of application No. 10/213,499, filed on Aug. 6, 2002, now Pat. No. 6,702,949, which is a continuation-in-part of application No. 10/123,004, filed on Apr. 15, 2002, which is a continuation of application No. 08/957,530, filed on Oct. 24, 1997, now Pat. No. 6,386,751.

(60) Provisional application No. 60/483,422, filed on Jun. 27, 2003.

(51) Int. Cl.
*A61K 33/00* (2006.01)
*B01F 7/16* (2006.01)

(52) U.S. Cl. ............... 366/170.3; 514/912; 604/289; 604/296; 366/171.1; 366/181.7

(58) Field of Classification Search ......... 514/912–915; 604/289, 294–296; 366/170.3, 171.1, 172.1, 366/181.7, 305
See application file for complete search history.

(56) References Cited

U.S. PATENT DOCUMENTS 1,627,161 A 5/1927 Edwards (Continued)

FOREIGN PATENT DOCUMENTS

DE 1557171 7/1970

(Continued)

OTHER PUBLICATIONS

Auclair et al., "Revisiting the Mechanism of P450 Enzymes with the Radical Clocks Norcarane and Spiro[2,5]octane," Journal of the American Chemical Society, 124(21):6020-6027, 2002.

(Continued)

*Primary Examiner*—Terry K Cecil
(74) *Attorney, Agent, or Firm*—Barry L. Davison; Davis Wright Tremaine LLP

(57) ABSTRACT

A system and method for generating an oxygen enriched aqueous solution for therapeutic application includes a diffuser comprising a first diffusing member having a surface incorporating surface disturbances, and a second diffusing member positioned relative to the first diffusing member to form a channel through which an aqueous solution and oxygen gas may flow. A reservoir containing the aqueous solution is connected to a pump that draws the aqueous solution from the reservoir and inputs the aqueous solution into the diffuser. The aqueous solution is moved through the channel relative to the surface disturbances to create cavitation in the aqueous solution to diffuse the oxygen gas into the aqueous solution to produce an oxygen enriched aqueous solution.

3 Claims, 11 Drawing Sheets

U.S. PATENT DOCUMENTS

| | | |
|---|---|---|
| 1,650,561 A | 11/1927 | Williams |
| 1,650,612 A | 11/1927 | Deniston |
| 1,711,154 A | 4/1929 | Michal |
| 2,115,123 A | 4/1938 | Russell |
| 2,606,502 A | 8/1952 | Carlson |
| 2,639,901 A | 5/1953 | Teale |
| 2,688,470 A | 9/1954 | Marco |
| 2,734,728 A | 2/1956 | Myers |
| 2,798,698 A | 7/1957 | Dooley |
| 2,969,960 A | 1/1961 | Gurley |
| 3,174,185 A | 3/1965 | Gerber |
| 3,182,975 A | 5/1965 | Stewart |
| 3,194,540 A | 7/1965 | Hager |
| 3,333,771 A | 8/1967 | Graham |
| 3,744,763 A | 7/1973 | Schnoring |
| 3,791,349 A | 2/1974 | Schaefer |
| 3,925,243 A | 12/1975 | Brogli |
| 3,937,445 A | 2/1976 | Agosta |
| 3,938,783 A | 2/1976 | Porter |
| 3,939,073 A | 2/1976 | Bats |
| 3,980,280 A | 9/1976 | Benson |
| 3,986,709 A | 10/1976 | Vermeulen |
| 3,996,012 A | 12/1976 | Zucker |
| 3,998,433 A | 12/1976 | Iwako |
| 4,004,553 A | 1/1977 | Stenstrom |
| 4,011,027 A | 3/1977 | Selder |
| 4,014,526 A | 3/1977 | Cramer |
| 4,049,240 A | 9/1977 | Walters |
| 4,051,204 A | 9/1977 | Muller |
| 4,057,223 A | 11/1977 | Rosenberger |
| 4,057,933 A | 11/1977 | Enyeart |
| 4,069,147 A | 1/1978 | Abrams |
| 4,071,225 A | 1/1978 | Holl |
| 4,089,507 A | 5/1978 | Arai |
| 4,097,026 A | 6/1978 | Haindl |
| 4,116,164 A | 9/1978 | Shabi |
| 4,117,550 A | 9/1978 | Folland |
| 4,127,332 A | 11/1978 | Thiruvengadam |
| 4,128,342 A | 12/1978 | Renk |
| 4,136,971 A | 1/1979 | Varlamov |
| 4,143,639 A | 3/1979 | Frenette |
| 4,144,167 A | 3/1979 | Burkett |
| 4,159,944 A | 7/1979 | Erickson |
| 4,162,153 A | 7/1979 | Spector |
| 4,163,712 A | 8/1979 | Smith |
| 4,172,668 A | 10/1979 | Thompson |
| 4,175,873 A | 11/1979 | Iwako |
| 4,183,681 A | 1/1980 | Li |
| 4,201,487 A | 5/1980 | Backhaus |
| 4,213,712 A | 7/1980 | Aanonsen |
| 4,261,521 A | 4/1981 | Ashbrook |
| 4,263,003 A | 4/1981 | Vork |
| 4,289,733 A | 9/1981 | Saito |
| 4,294,549 A | 10/1981 | Thompson |
| 4,316,673 A | 2/1982 | Speer |
| 4,318,429 A | 3/1982 | Gouttebessis |
| 4,332,486 A | 6/1982 | Mutalibov |
| 4,361,414 A | 11/1982 | Nemes |
| 4,368,986 A | 1/1983 | Fischer |
| 4,383,767 A | 5/1983 | Jido |
| 4,393,017 A | 7/1983 | Kim |
| 4,394,966 A | 7/1983 | Snyder |
| 4,408,890 A | 10/1983 | Beckmann |
| 4,424,797 A | 1/1984 | Perkins |
| 4,436,430 A | 3/1984 | Mayer |
| 4,441,823 A | 4/1984 | Power |
| 4,444,510 A | 4/1984 | Janssen |
| 4,469,595 A | 9/1984 | Napadow |
| 4,474,479 A | 10/1984 | Redelman |
| 4,477,338 A | 10/1984 | Hellmann |
| 4,509,861 A | 4/1985 | Sjonell |
| 4,533,254 A | 8/1985 | Cook |
| 4,539,139 A | 9/1985 | Ichikawa |
| 4,594,228 A | 6/1986 | Lambert |
| 4,619,072 A | 10/1986 | Privett |
| 4,633,909 A | 1/1987 | Louboutin |
| 4,634,675 A | 1/1987 | Freedman |
| 4,645,606 A | 2/1987 | Ashbrook |
| 4,661,243 A | 4/1987 | Hotz |
| 4,663,055 A | 5/1987 | Ling |
| 4,664,680 A | 5/1987 | Weber |
| 4,684,614 A | 8/1987 | Krovak |
| 4,696,283 A | 9/1987 | Kohlmetz |
| 4,715,274 A | 12/1987 | Paoletti |
| 4,733,972 A | 3/1988 | Weis |
| 4,735,133 A | 4/1988 | Paoletti |
| 4,749,493 A | 6/1988 | Hicks |
| 4,753,535 A | 6/1988 | King |
| 4,764,283 A | 8/1988 | Ashbrook |
| 4,765,807 A | 8/1988 | Henriksen |
| 4,778,336 A | 10/1988 | Husain |
| 4,793,247 A | 12/1988 | Verweij |
| 4,798,176 A | 1/1989 | Perkins |
| 4,808,007 A | 2/1989 | King |
| 4,834,545 A | 5/1989 | Inoue |
| 4,838,699 A | 6/1989 | Jour |
| 4,880,445 A | 11/1989 | Watten |
| 4,884,892 A | 12/1989 | Gust |
| 4,906,574 A | 3/1990 | Erdei |
| 4,937,004 A | 6/1990 | Mandrin |
| 4,957,626 A | 9/1990 | Ashbrook |
| 4,972,801 A | 11/1990 | Hunt |
| 4,973,168 A | 11/1990 | Chan |
| 4,976,547 A | 12/1990 | Hisanaga |
| 4,999,015 A | 3/1991 | Demaris |
| 5,005,982 A | 4/1991 | Kistner |
| 5,024,647 A | 6/1991 | Jubin |
| 5,052,813 A | 10/1991 | Latto |
| 5,152,212 A | 10/1992 | Chauveau |
| 5,176,447 A | 1/1993 | Bata |
| 5,185,081 A | 2/1993 | Nyman |
| 5,188,090 A | 2/1993 | Griggs |
| 5,263,774 A | 11/1993 | Delcourt |
| 5,275,486 A | 1/1994 | Fissenko |
| 5,279,262 A | 1/1994 | Muehleck |
| 5,279,463 A | 1/1994 | Holl |
| 5,281,341 A | 1/1994 | Reimers |
| 5,304,001 A | 4/1994 | Kuo |
| 5,318,702 A | 6/1994 | Ashbrook |
| 5,326,484 A | 7/1994 | Nakashima |
| 5,341,768 A | 8/1994 | Pope |
| 5,366,288 A | 11/1994 | Dahllof |
| 5,370,824 A | 12/1994 | Nagano |
| 5,372,424 A | 12/1994 | Lecouturier |
| 5,380,089 A | 1/1995 | Karasawa |
| 5,380,471 A | 1/1995 | Ban |
| 5,403,089 A | 4/1995 | Kuo |
| 5,407,637 A | 4/1995 | Gibboney |
| 5,419,306 A | 5/1995 | Huffman |
| 5,435,913 A | 7/1995 | Ashbrook |
| 5,450,368 A | 9/1995 | Kubota |
| 5,470,153 A | 11/1995 | De Naeghel |
| 5,474,380 A | 12/1995 | Sukup |
| 5,482,369 A | 1/1996 | Verstallen |
| 5,496,108 A | 3/1996 | Sukup |
| 5,511,877 A | 4/1996 | King |
| 5,538,191 A | 7/1996 | Holl |
| 5,538,343 A | 7/1996 | Tynan |
| 5,551,859 A | 9/1996 | Cantrill |
| 5,552,133 A * | 9/1996 | Lambert et al. ............ 424/9.52 |
| 5,560,710 A | 10/1996 | Klocke |
| 5,561,944 A | 10/1996 | Ismail |
| 5,563,189 A | 10/1996 | Hosokawa |
| 5,569,416 A | 10/1996 | Cross |

| | | | | | | |
|---|---|---|---|---|---|---|
| 5,575,559 | A | 11/1996 | Roll | 6,412,714 B1 | 7/2002 | Witsken |
| 5,590,961 | A | 1/1997 | Rasmussen | 6,413,418 B2 | 7/2002 | Brahmbhatt |
| 5,616,304 | A | 4/1997 | Stormo | 6,431,742 B2 | 8/2002 | Mori |
| 5,658,380 | A | 8/1997 | Dillenbeck | 6,443,610 B1 | 9/2002 | Shechter |
| 5,671,664 | A | 9/1997 | Jacobson | 6,474,264 B1 | 11/2002 | Grimberg |
| 5,674,312 | A | 10/1997 | Mazzei | 6,474,862 B2 | 11/2002 | Farrell |
| 5,697,187 | A | 12/1997 | Persinger | 6,481,649 B1 | 11/2002 | Schmidt |
| 5,711,950 | A | 1/1998 | Lorenzen | 6,485,003 B2 | 11/2002 | Speece |
| 5,720,551 | A | 2/1998 | Shechter | 6,488,401 B1 | 12/2002 | Seaman |
| 5,744,105 | A | 4/1998 | Stormo | 6,488,765 B1 | 12/2002 | Tseng |
| 5,766,490 | A | 6/1998 | Taylor | 6,494,055 B1 | 12/2002 | Meserole |
| 5,770,062 | A | 6/1998 | Isbell | 6,499,671 B1 | 12/2002 | Sands |
| 5,779,996 | A | 7/1998 | Stormo | 6,521,248 B1 | 2/2003 | Holloway |
| 5,782,556 | A | 7/1998 | Chu | 6,524,475 B1 | 2/2003 | Herrington |
| 5,791,778 | A | 8/1998 | Manninen | 6,530,895 B1 | 3/2003 | Keirn |
| 5,810,052 | A | 9/1998 | Kozyuk | 6,538,041 B1 | 3/2003 | Marelli |
| 5,810,474 | A | 9/1998 | Hidalgo | 6,557,492 B1 | 5/2003 | Robohm |
| 5,813,758 | A | 9/1998 | Delcourt | 6,576,130 B2 | 6/2003 | Wallace |
| 5,814,222 | A * | 9/1998 | Zelenak et al. ............. 210/615 | 6,619,399 B1 | 9/2003 | Chatterji |
| 5,823,671 | A | 10/1998 | Mitchell | 6,627,784 B2 | 9/2003 | Hudson |
| 5,845,993 | A | 12/1998 | Shirtum | 6,632,014 B2 | 10/2003 | Steinberg |
| 5,851,068 | A | 12/1998 | Rumph | 6,649,145 B2 * | 11/2003 | McGrath et al. ............. 424/45 |
| 5,865,537 | A | 2/1999 | Streiff | 6,655,830 B1 | 12/2003 | Seaman |
| 5,868,495 | A | 2/1999 | Hidalgo | 6,676,900 B1 | 1/2004 | Divino |
| 5,868,944 | A | 2/1999 | Wright | 6,682,215 B2 | 1/2004 | Kinsley |
| 5,885,467 | A | 3/1999 | Zelenak | 6,688,883 B2 | 2/2004 | Tseng |
| 5,887,383 | A | 3/1999 | Soeda | 6,689,262 B2 | 2/2004 | Senkiw |
| 5,893,337 | A | 4/1999 | Sevic | 6,702,949 B2 | 3/2004 | Wood |
| 5,902,042 | A | 5/1999 | Imaizumi | 6,705,755 B1 | 3/2004 | Innings |
| 5,904,851 | A | 5/1999 | Taylor | 6,733,172 B2 | 5/2004 | Lee |
| 5,918,976 | A | 7/1999 | Hashimoto | 6,749,329 B2 | 6/2004 | Shechter |
| 5,921,678 | A | 7/1999 | Desai | 6,752,529 B2 | 6/2004 | Holl |
| 5,921,679 | A | 7/1999 | Muzzio | 6,764,213 B2 | 7/2004 | Shechter |
| 5,925,292 | A | 7/1999 | Ziesenis | 6,796,702 B2 | 9/2004 | Wire |
| 5,931,771 | A | 8/1999 | Kozyuk | 6,821,438 B2 | 11/2004 | Hadley |
| 5,938,581 | A | 8/1999 | Bibette | 6,857,774 B2 | 2/2005 | Kozyuk |
| 5,948,326 | A | 9/1999 | Pate | 6,935,768 B2 | 8/2005 | Lowe |
| 5,951,922 | A | 9/1999 | Mazzei | 6,935,770 B2 | 8/2005 | Schueler |
| 5,971,601 | A | 10/1999 | Kozyuk | 6,936,179 B2 | 8/2005 | DeWald |
| 5,993,752 | A | 11/1999 | Kobayashi | 6,955,713 B2 | 10/2005 | Rittner |
| 6,000,840 | A | 12/1999 | Paterson | 7,008,535 B1 | 3/2006 | Spears |
| 6,017,447 | A | 1/2000 | Wright | 7,037,842 B2 | 5/2006 | Verhaverbeke |
| 6,019,499 | A | 2/2000 | Selivanov | 7,137,620 B2 | 11/2006 | Thomas |
| 6,042,792 | A | 3/2000 | Shefer | 2001/0022755 A1 | 9/2001 | Holtzapple |
| 6,086,243 | A | 7/2000 | Paul | 2002/0164379 A1 * | 11/2002 | Nishihara et al. ........... 424/600 |
| 6,092,921 | A | 7/2000 | Wentinck | 2003/0042174 A1 | 3/2003 | Austin |
| 6,110,353 | A | 8/2000 | Hough | 2003/0072212 A1 | 4/2003 | Wood |
| 6,120,008 | A | 9/2000 | Littman | 2003/0188740 A1 | 10/2003 | Tribelsky |
| 6,135,628 | A | 10/2000 | DeStefano | 2003/0232114 A1 | 12/2003 | Dekleva |
| 6,173,526 | B1 | 1/2001 | Mazzei | 2004/0090862 A1 | 5/2004 | Uesugi |
| 6,190,549 | B1 | 2/2001 | Schwartz | 2004/0222106 A1 | 11/2004 | Hough |
| 6,210,030 | B1 | 4/2001 | Ibar | 2006/0150491 A1 | 7/2006 | Senkiw |
| 6,228,259 | B1 | 5/2001 | Schwartz | | | |
| 6,234,206 | B1 | 5/2001 | Malmberg | | FOREIGN PATENT DOCUMENTS | |
| 6,238,645 | B1 * | 5/2001 | Spears .................. 424/43 | DE | 3436049 | 4/1986 |
| 6,238,706 | B1 | 5/2001 | Sonnenschein | DE | 4317078 | 11/1994 |
| 6,250,609 | B1 | 6/2001 | Cheng | DE | 4317078 A1 * | 11/1994 |
| 6,257,754 | B1 | 7/2001 | Sondergaard | DE | 10105118 | 8/2002 |
| 6,276,825 | B2 | 8/2001 | Running | EP | 0363009 | 4/1990 |
| 6,279,611 | B2 | 8/2001 | Uematsu | EP | 0555498 | 8/1993 |
| 6,279,882 | B1 | 8/2001 | Littman | EP | 0682000 | 11/1995 |
| 6,284,293 | B1 | 9/2001 | Crandall | EP | 0880993 | 12/1998 |
| 6,290,857 | B1 | 9/2001 | Brahmbhatt | EP | 1201296 | 10/2001 |
| 6,294,212 | B1 | 9/2001 | Huber | JP | 2004 074131 | 3/2004 |
| 6,299,343 | B1 | 10/2001 | Pekerman | RU | 1768269 | 10/1992 |
| 6,312,647 | B1 | 11/2001 | Spears | RU | 1773469 | 11/1992 |
| 6,332,706 | B1 | 12/2001 | Hall | RU | 1820861 | 6/1993 |
| 6,338,569 | B1 | 1/2002 | McGill | RU | 2091151 | 9/1997 |
| 6,380,264 | B1 | 4/2002 | Jameson | RU | 2131761 | 6/1999 |
| 6,382,601 | B1 | 5/2002 | Ohnari | RU | 2165787 | 4/2001 |
| 6,386,751 | B1 | 5/2002 | Wootan | RU | 2166987 | 5/2001 |
| 6,398,402 | B1 | 6/2002 | Thomas | RU | 2284853 | 4/2005 |
| 6,402,361 | B1 | 6/2002 | Reinemuth | | | |

| | | |
|---|---|---|
| SU | 127999 | 1/1960 |
| SU | 162461 | 12/1961 |
| SU | 280441 | 11/1970 |
| SU | 495099 | 3/1976 |
| SU | 495862 | 12/1976 |
| SU | 889078 | 12/1981 |
| SU | 921611 | 4/1982 |
| SU | 1281290 | 1/1987 |
| SU | 1584990 | 8/1990 |
| SU | 1706683 | 1/1992 |
| WO | WO 98/30319 | 7/1998 |
| WO | WO 00/02651 | 1/2000 |
| WO | WO 00/20109 | 4/2000 |
| WO | WO 01/87471 | 11/2001 |
| WO | WO 02/38510 | 5/2002 |
| WO | WO 02/062455 | 8/2002 |
| WO | WO 03/044430 | 5/2003 |
| WO | WO 2004/013049 | 2/2004 |
| WO | WO 2004/016344 | 2/2004 |

OTHER PUBLICATIONS

Austin et al., "The Non-Heme Diiron Alkane Monooxygenase of *Pseudomonas oleovorans* (AlkB) Hydroxylates via a Substrate Radical Intermediate," Journal of the American Chemical Society, 122:11747-11748, 2000.

Austin, et al., "Xylene monooxygenase, a membrane-spanning non-heme diiron enzyme that hydroxylates hydrocarbons via a substrate radical intermediate," Journal of Inorganic Chemistry, 8:733-740, 2003.

Bonanno, "Corneal Metabolic Activity in Humans: Corneal Oxygen Consumption," Indiana University School of Optometry Faculty Research, retrieved Apr. 9, 2003, from http://www.opt.indiana.edu/people/faculty/bonanno/oxygen.htm (4 pages).

Bragg et al., "Hydrated Electron Dynamics: From Clusters to Bulk," Science Magazine, 360(5696):669-671, Sep. 16, 2004.

Brazeau et al., "Intermediate Q from Soluble Methane Monooxygenase Hydroxylates the Mechanistic Substrate Probe Norcarane: Evidence for a Stepwise Reaction," Journal of the American Chemical Society, 123(48):11831-11837, Dec. 5, 2001.

Chaplin, "Declustered Water, Anomalous Water and Crystals," retrieved Jul. 10, 2006, from http://lsbu.ac.uk/water/anmlous.html (4 pages).

Compilation of: (1) Abstract of Wunderlich et al., "In vivo observation of oxygen-supersaturated water in the human mouth and stomach," Magnetic Resonance Imaging, 22(4):551-556, 2004; (2) Abstract of Divino et al., "Injection of highly supersaturated oxygen solutions without nucleation," Journal of Biomechanical Engineering, 124(6):676-683, 2002; (3) Product Information from *O2Canada Water, Inc.*; (4) Production Information from FBC Technologies, "O²x-Box® Super Oxygenation Process"; and (5) Wayne State Univeristy Press Release entitled "Researcher Discovers Potential Approach to Hyperoxygenate Blood," Apr. 4, 2006 (4 pages).

De Angelis et al., "Electronic Structure and Reactivity of Isomeric Oxo-Mn(V) Porphyrins: Effects of Spin-State Crossing and $pK_a$ Modulation," Inorganic Chemistry, 45(10):4268-4276, Feb. 22, 2006.

Florusse et al., "Stable Low-Pressure Hydrogen Clusters Stored in a Binary Clathrate Hydrate," Science Magazine, 306:469-471, Oct. 15, 2004.

Frauenfelder et al., "The role of structure, energy landscape, dynamics, and allostery in the enzymatic function of myoglobin," Proceedings of the National Academy of Sciences, 98(5):2370-2374, Feb. 27, 2001.

Groves, "High-valent iron in chemical and biological oxidations," Journal of Inorganic Biochemistry, 100:434-447, Jan. 14, 2006.

Groves, "Reactivity and mechanisms of metalloporphyrin-catalyzed oxidations," Journal of Porphyrins and Phthalocyanines, 4:350-352, 2002.

Hammer et al., "How Do Small Water Clusters Bind an Excess Electron," Science Magazine, 306(5696):675-679, Sep. 16, 2004.

Harvitt, "Corneal Oxygen Availability and Metabolism with Contact Lens Wear" and Harvitt et al., "Re-evaluation of the Oxygen Diffusion Model for Predicting Minimum Contact Lens Dk/t Values Needed to Avoid Corneal Anoxia," retrieved Apr. 9, 2003, from http://vision.berkeley.edu/sarver/mdsl_harvitt_research.html.

Headrick et al., "Spectral Signatures of Hydrated Proton Vibrations in Water Clusters," Science Magazine, 308:1765-1770, Jun. 17, 2005.

Jia et al., "Atomic-Resolution Measurement of Oxygen Concentration in Oxide Materials," Science Magazine, 303:2001-2004, Mar. 26, 2004.

Jin et al., "Unusual Kinetic Stability of a Ground-State Singlet Oxomanganese(V) Porphyrin. Evidence for a Spin State Crossing Effect," Journal of the American Chemical Society, 121:2923-2924, 1999.

Life 02 International (Asia) Co., Ltd., retrieved Jun. 3, 2003, from www.lifeo2asia.com/medical.html (1 page).

Lower, "The BunkHouse: Water pseudoscience gallery, Gallery of water-related pseudoscience, Junk science in the marketplace," retrieved Jul. 25, 2006, from http://chem1.com/CO/gallery.html (18 pages).

Luo et al., "Mycobactin-mediated iron acquisition within macrophages," Nature Chemical Biology, 1(3):149-153, Aug. 2005.

Miyazaki et al., "Infrared Spectroscopic Evidence for Protonated Water Clusters Forming Nanoscale Cages," Science Magazine, 304:1134-1137, Apr. 29, 2004.

Moe et al., "Remarkable Aliphatic Hydroxylation by the Diiron Enzyme Toluene 4-Monooxygenase in reactions with Radical or Cation Diagnostic Probes Norcarane, 1,1-Dimethylcyclopropane, and 1,1-Diethylcyclopropane," American Chemical Society, 43:15688-15701, Jul. 1, 2004.

Morris, "The physiological causes of contact lens complications," Optometry Today, :pp. 28-33, Dec. 3, 1999.

Paik et al., "Electrons in Finite-Sized Water Cavities: Hydration Dynamics Observed in Real Time," Science Express, 306(5696):672-675, Sep. 16, 2004.

Patent Office of the Russian Federation, "Official Action," Application No. 2004133560/15(036500), Jan. 27, 2006, original in Russian plus English translation (6 pages).

"Protonated Water Clusters in Interstellar Clouds, the Upper Atmosphere and Biomolecules," retrieved Oct. 29, 2004, from http://pro3.chem.pitt.edu/richard/prot_clust_nature.html (1 page).

ScienceWeek (1) "Chemistry: On Protonated Water Clusters" (points made by Zwier [Science 2004 204:1119]); "On Water Structure" (points made by Head-Gordon et al. [Chem. Rev. 2002 102:2651]); "Liquid Water: Current Research Problems" (points made by Keutsch et al. [Proc. Nat. Acad. Sci. 2001 98:10533]) (5 pages).

Shin et al., "Infrared Signature of Structures Associated with the $H^+(H_2O)_n$ (n=6 to 27) Clusters," Science Magazine, 304:1137-1140, May 21, 2004.

"Sonochemistry—General Overview," retrieved Nov. 21, 2002, from http://www.und.ac.za/prg/sonochem/ultragen.html (2 pages).

Wang, "Radical Clocks: Molecular Stopwatches for tiing Radical Reactions," pp. 65-72, Apr. 27, 2006.

Zwier, "The Structure of Protonated Water Clusters," Science Magazine, 304 (5674):1119-1120, Apr. 29, 2004.

\* cited by examiner

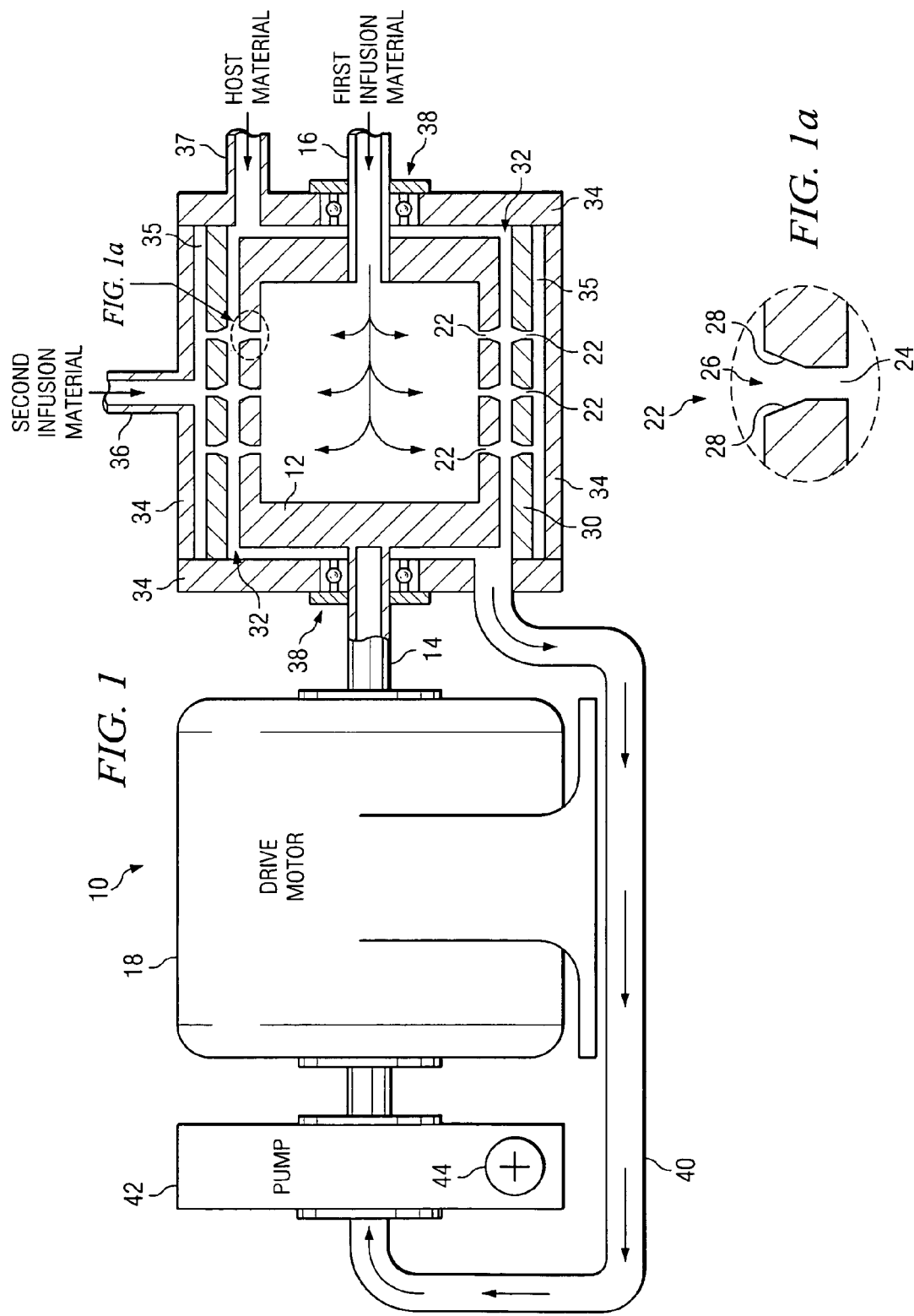

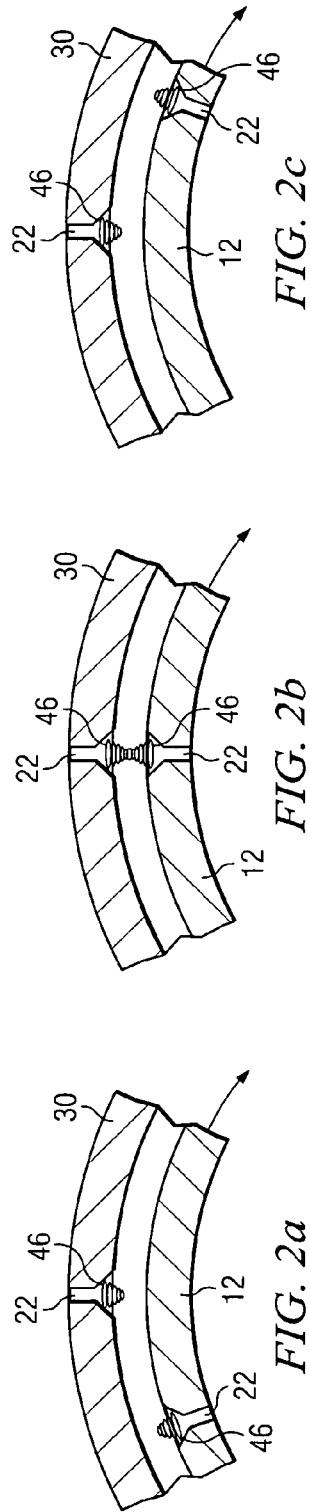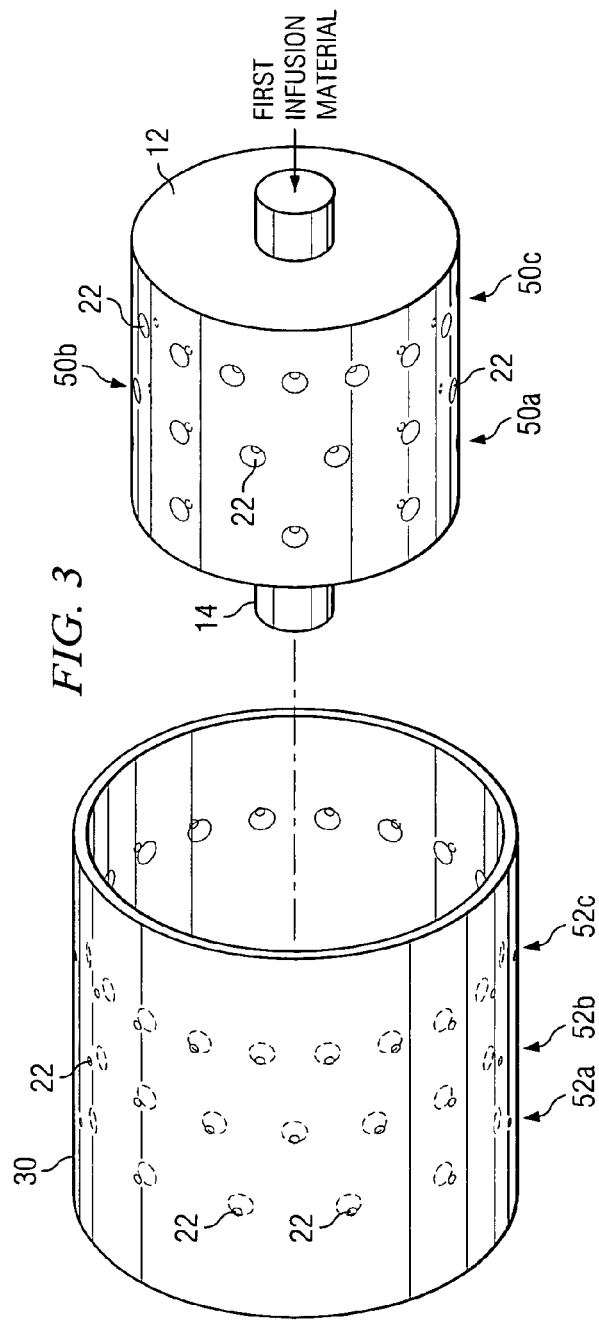

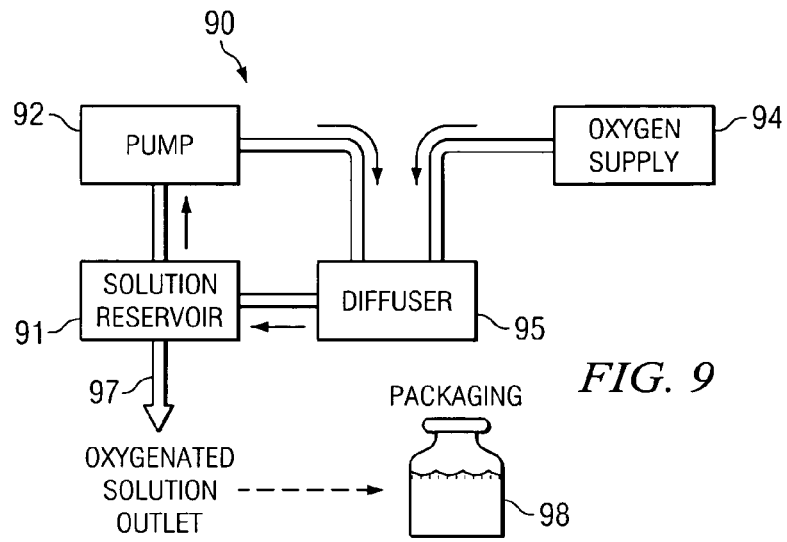
*FIG. 9*
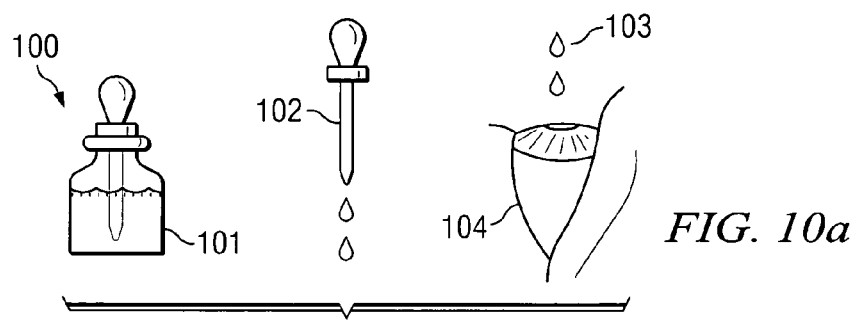
*FIG. 10a*
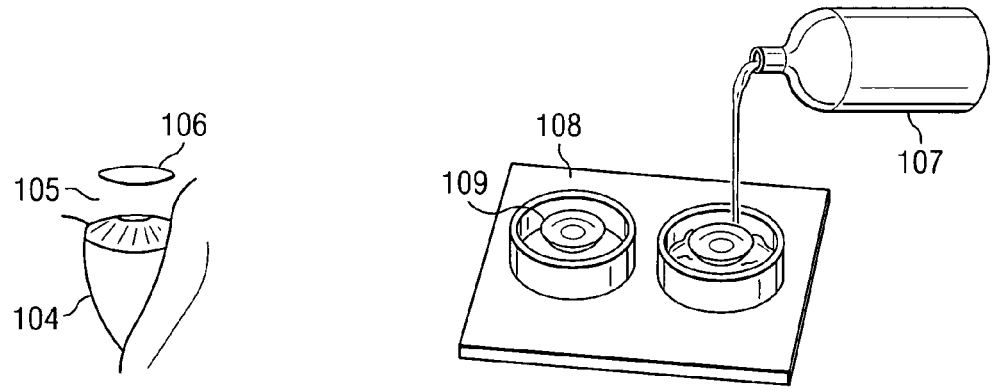
*FIG. 10b*     *FIG. 10c*

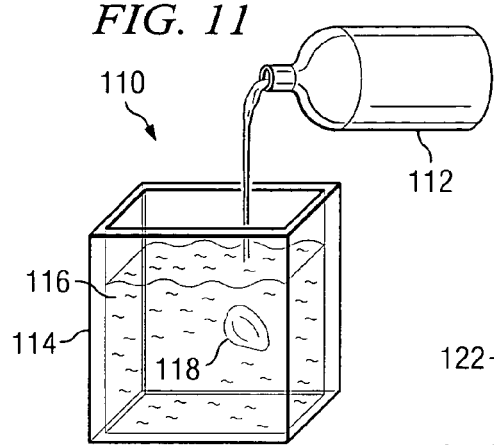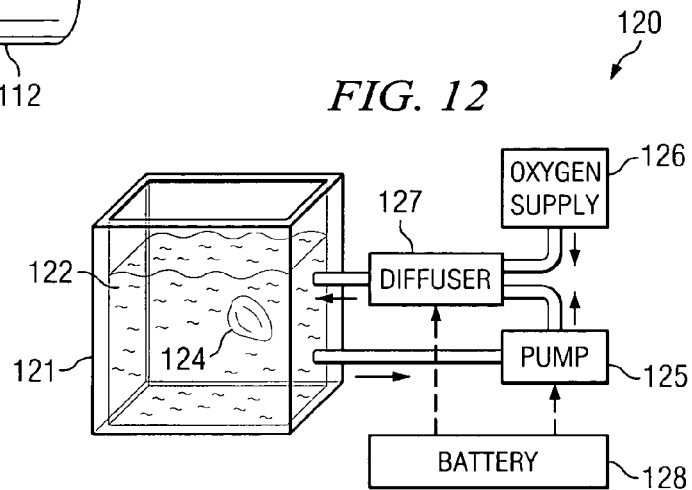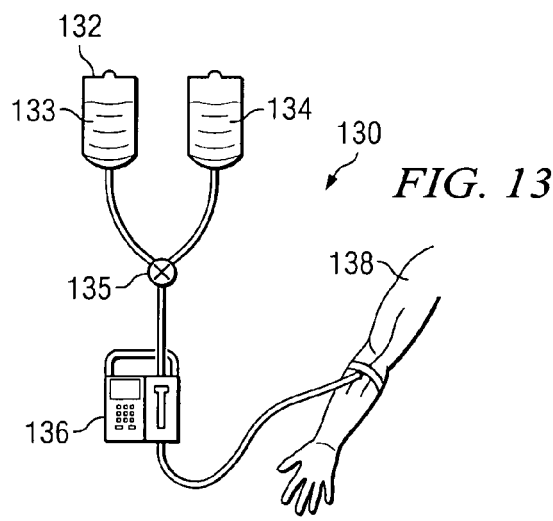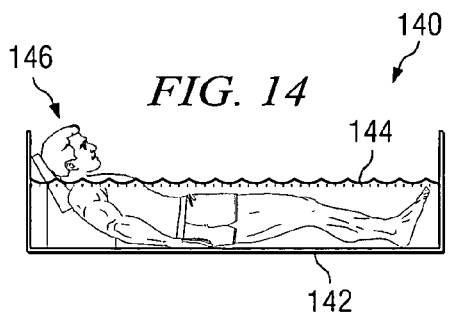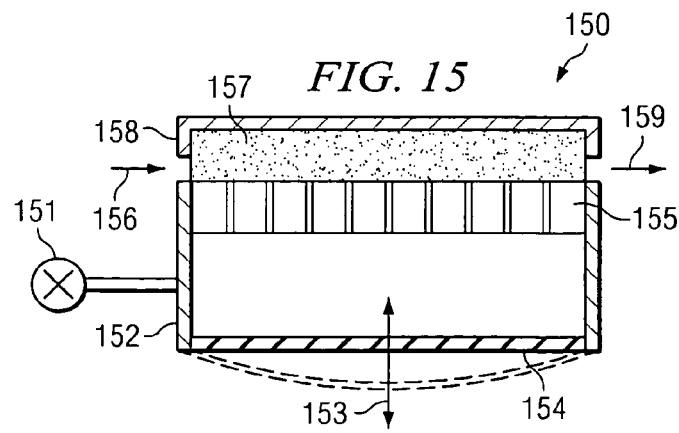

SYSTEM AND METHOD FOR THERAPEUTIC APPLICATION OF DISSOLVED OXYGEN

CROSS-REFERENCE TO RELATED APPLICATIONS

This application claims priority on provisional patent application Ser. No. 60/483,422 filed Jun. 27, 2003.

This application is a Continuation-In-Part of U.S. patent application Ser. No. 10/796,583, filed Mar. 9, 2004, now U.S. Pat. No. 6,974,546, issued on Dec. 13, 2005, entitled "DIFFUSER/EMULSIFIER FOR USE IN AQUACULTURE APPLICATIONS" which is a Continuation of U.S. patent application Ser. No. 10/213,499, filed Aug. 6, 2002, now U.S. Pat. No. 6,702,949, issued on Mar. 9, 2004, entitled "DIFFUSER/EMULSIFIER FOR USE IN AQUACULTURE APPLICATIONS," which is a Continuation-in Part of U.S. patent application Ser. No. 10/123,004 filed Apr. 15, 2002 entitled "DIFFUSER/EMULSIFIER," which in a Continuation of U.S. patent application Ser. No. 08/957,530, filed Oct. 24, 1997 entitled "DIFFUSER/EMULSIFIER," now U.S. Pat. No. 6,386,751 issued on May 14, 2002.

FIELD OF INVENTION

This invention relates in general to diffusers and, more particularly, to a method and apparatus for diffusing or emulsifying a gas or liquid into a material.

BACKGROUND OF THE INVENTION

This invention relates in general to diffusers and, more particularly, to a method and apparatus for diffusing or emulsifying a gas or liquid into a material.

The oxygen available in water or other liquids often has a therapeutic value. For example, eyes have a minimum necessary oxygen requirement. The continued presence of oxygen on the eye can be difficult to maintain when wearing contact lenses, particularly when contacts are worn during sleep when the eyes are closed. With typical contact lenses, oxygen passes through the water in the lens. There is a limit to the amount of water that can be used in any contact lens material and this, in turn, limits the amount of oxygen that can get to the eye. The oxygen content of the water used in the manufacture, storage, cleaning and wetting of contact lenses is an important factor in their manufacture and use. In particular, a contact lens wearer's ocular tissue can be damaged by a lack of oxygen. Contact lenses are designed in order to maximize the amount of oxygen reaching the cornea, keeping the eyes fresh and healthy all day long In many applications, it is necessary to diffuse or emulsify one material—gas or liquid—within a second material. Emulsification is a subset of the process of diffusion wherein small globules of one liquid are suspended in a second liquid with which the first will not mix, such as oil into vinegar. One important application of the diffusion process is in wastewater treatment. Many municipalities aerate their wastewater as part of the treatment process in order to stimulate biological degradation of organic matter. The rate of biological digestion of organic matter is very dependent upon the amount of oxygen in the wastewater, since the oxygen is necessary to sustain the life of the microorganisms which consume the organic matter. Additionally, oxygen is able to remove some compounds, such as iron, magnesium and carbon dioxide.

There are several methods of oxygenating water. First, turbine aeration systems release air near the rotating blades of an impeller which mixes the air or oxygen with the water. Second, water can be sprayed into the air to increase its oxygen content. Third, a system produced by AQUATEX injects air or oxygen into the water and subjects the water/gas to a large scale vortex. Tests on the AQUATEX device have shown an improvement to 200% dissolved oxygen (approximately 20 ppm (parts per million)) under ideal conditions Naturally occurring levels of oxygen in water are approximately 10 ppm maximum, which is considered to be a level of 100% dissolved oxygen. Thus, the AQUATEX device doubles the oxygen content of the water. The increased oxygenation levels last only minutes prior to reverting back to 100% dissolved oxygen levels.

Greater oxygenation levels, and longer persistence of the increased oxygen levels, could provide significant benefits in treating wastewater. Importantly, the efficiency of the organic digestion would be increased and the amount of time need for biological remediation would decrease, improving on the capacity of wastewater treatment facilities.

Accordingly, a need has arisen for a diffusing mechanism capable of diffusing high levels of one or more materials into another material.

SUMMARY OF THE INVENTION

A system and method for generating an oxygen enriched aqueous solution for therapeutic application includes a diffuser comprising a first diffusing member having a surface incorporating surface disturbances, and a second diffusing member positioned relative to the first diffusing member to form a channel through which an aqueous solution and oxygen gas may flow. A reservoir containing the aqueous solution is connected to a pump that draws the aqueous solution from the reservoir and inputs the aqueous solution into the diffuser. The aqueous solution is moved through the channel relative to the surface disturbances to create cavitation in the aqueous solution to diffuse the oxygen gas into the aqueous solution to produce an oxygen enriched aqueous solution.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIGS. 1 and 1a illustrate a partially cross sectional, partially block diagram of a first embodiment of a diffuser;

FIGS. 2a, 2b and 2c illustrate the diffusion process internal to the diffuser;

FIG. 3 illustrates an exploded view of the rotor and stator of the diffuser;

FIG. 9 illustrates a schematic drawing of a method for producing oxygenated solutions using a diffuser in accordance with the present invention;

FIGS. 10a through 10c illustrate an oxygenated solution and its application to the eye as drops or as contact lens solution;

FIG. 11 illustrates the storage and transportation of organs or living tissues in a container filled with oxygenated solution;

FIG. 12 illustrates the storage and transportation of organs or living tissue using a system having a container of oxygenated solution and having a portable pump and diffuser recirculation system;

FIG. 13 illustrates the delivery of oxygenated medicine, plasma, or other intravenous fluid to a patient;

FIG. 14 illustrates the use of oxygenated solution in hydrotherapy or other topical application to a patient;

FIG. 15 illustrates an alternative embodiment of a pump and diffuser system constructed in accordance with a disclosed embodiment

DETAILED DESCRIPTION OF THE INVENTION

Figure 4:
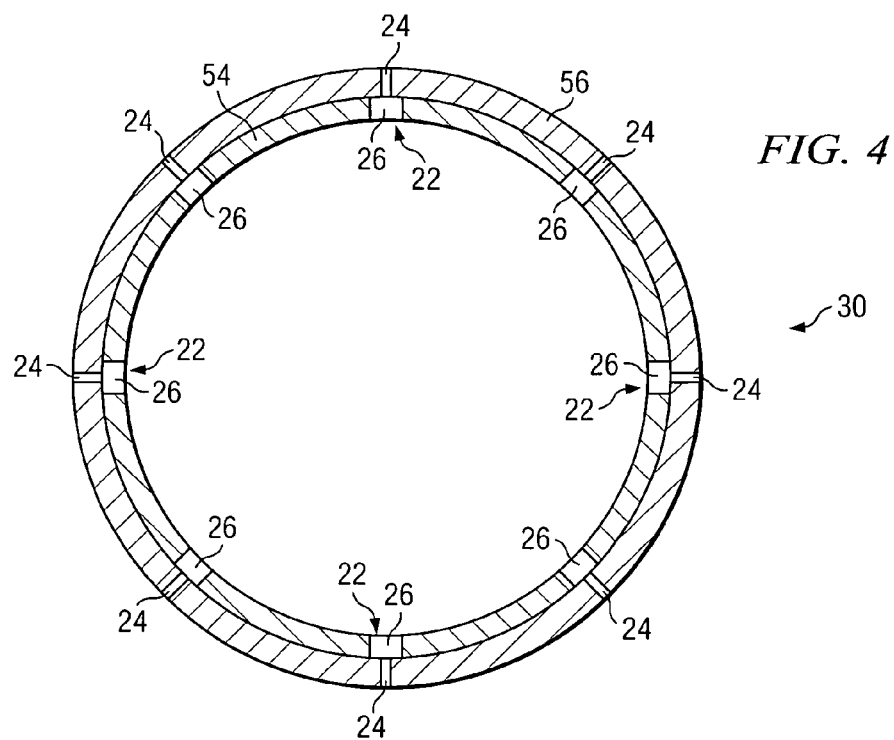
FIG. 4 illustrates an embodiment of the stator.

Referring now to the drawings, wherein like reference numbers are used to designate like elements throughout the various views, several embodiments of the present invention are further described. The figures are not necessarily drawn to scale, and in some instances the drawings have been exaggerated or simplified for illustrative purposes only. One of ordinary skill in the art will appreciate the many possible applications and variations of the present invention based on the following examples of possible embodiments of the present invention.

The present invention is best understood in relation to FIGS. 1-8 of the drawings, like numerals being used for like elements of the various drawings.

FIGS. 1 and 1a illustrate a partially block diagram, partially cross-sectional view first embodiment of a device 10 capable of diffusing or emulsifying one or two gaseous or liquid materials (hereinafter the "infusion materials") into another gaseous or liquid material (hereinafter the "host material"). The host material may be a normally solid material which is heated or otherwise processed to be in a liquid or gaseous state during the diffusion/emulsification process.

A rotor 12 comprises a hollow cylinder, generally closed at both ends. Shaft 14 and inlet 16 are coupled to the ends of the rotor 12. A first infusion material can pass through inlet 16 into the interior of rotor 12. Shaft 14 is coupled to a motor 18, which rotates the rotor at a desired speed. The rotor 12 has a plurality of openings 22 formed there through, shown in greater detail in FIG. 1a. In the preferred embodiment, the openings 22 each have a narrow orifice 24 and a larger borehole 26. The sidewalls 28 of the boreholes 26 can assume various shapes including straight (as shown in FIG. 4), angled (as shown in FIG. 1) or curved.

A stator 30 encompasses the rotor 12, leaving a channel 32 between the rotor and the stator through which the host material may flow. The stator 30 also has openings 22 formed about its circumference. A housing 34 surrounds the stator 30 and inlet 36 passes a second infusion material to an area 35 between the stator 30 and the housing 34. The host material passes through inlet 37 into the channel 32. Seals 38 are formed between the shafts 14 and 16 and the housing 34. An outlet 40 passes the host material from the channel 32 to a pump 42, where it exits via pump outlet 44. The pump may also be driven by motor 18 or by an auxiliary source.

In operation, the diffusion device receives the host material through inlet 37. In the preferred embodiment, pump 42 draws the host material on the pump's suction side in order to allow the host material to pass through the channel at low pressures. The first and second infusion materials are introduced to the host material through openings 22. The infusion materials may be pressurized at their source to prevent the host material from passing through openings 22.

The embodiment shown in FIG. 1 has separate inlets for 16 and 36 for the diffusion materials. This arrangement allows two different infusion materials to be introduced to the host material. Alternatively, a single infusion material could be introduced into both inlets.

In tests, the embodiment shown in FIG. 1 has demonstrated high levels of diffusion of the infusion material(s) into the host material. Tests using oxygen as the infusion material and water as the host material have resulted in levels of 400% dissolved oxygen in the water, with the increased oxygen levels lasting for days.

The reason for the high efficiency and persistence of the diffusion is believed to be the result of micro-cavitation, which is described in connection with FIGS. 2a-c. Whenever a material flows over a smooth surface, a rather laminar flow is established with a thin boundary layer that is stationary or moving very slowly because of the surface tension between the moving fluid and the stationary surface. The openings 22, however, disrupt the laminar flow and can cause compression and decompression of the material. If the pressure during the decompression cycle is low enough, voids (cavitation bubbles) will form in the material. The cavitation bubbles generate a rotary flow pattern 46, like a tornado, because the localized area of low pressure draws the host material and the infusion material, as shown in FIG. 2a. When the cavitation bubbles implode, extremely high pressures result. As two aligned openings pass one another, a succussion (shock wave) occurs, generating significant energy. The energy associated with cavitation and succussion mixes the infusion material and the host material to an extremely high degree, perhaps at the molecular level.

The tangential velocity of the rotor 12 and the number of openings that pass each other per rotation dictate the frequency at which the device operates. It has been found that operation in the ultrasonic frequency can be beneficial in many applications. It is believed that operating the device in the ultrasonic region of frequencies provides the maximum succussion shock energy to shift the bonding angle of the fluid molecule, which enables it to transport additional infusion materials which it would not normally be able to retain. The frequency at which the diffuser operates appears to affect the degree of diffusion, leading to much longer persistence of the infusion material in the host material.

In some applications, a particular frequency or frequencies may be desired to break down certain complex molecules, such as in the case of water purification. In this application, multiple frequencies of succussion can be used to break complex structures, such as VOCs (volatile organic compounds), into smaller sub-structures. Ozone can be used as one of the infusion materials to oxidize the sub-structures at a high efficiency.

Other sonochemistry applications can be performed with the device 10. In general, sonochemistry uses ultrasound to assist chemical reactions. Typically, the ultrasound is generated using a piezoelectric or other electro-acoustical device. A problem associated with electro-acoustical transducers is that the sound waves do not provide uniform sound waves throughout the material; rather, the desired cavitation is localized around the device itself. The present invention allows the ultrasonic waves to be produced throughout a material using a simple mechanical device.

FIG. 3 illustrates an exploded view of an embodiment of the rotor 12 and stator 30 where multiple frequencies may be obtained at a single rotational velocity. In FIG. 3, three circular arrays of openings 50 (shown individually as arrays 50a, 50b, and 50c) of openings 22 are disposed circumferentially about the rotor 12. Each ring has a different number of openings evenly spaced about its circumference. In similar fashion, the stator 30 would have three circular arrays of openings 52 (shown individually as arrays 52a, 52b, and 52c). To ensure that only one pair of openings between corresponding arrays will be coincident at any one time, the number of openings 22 in a given array 52 on the stator 30 can be one more (or less) than the number of openings 22 in the corresponding array 50 of the rotor 12. Thus, for example, if array 50a had twenty openings evenly spaced around the circumference of rotor 12, array 52 could have 21 openings spaced evenly around the circumference of stator 30.

As the rotor 12 of FIG. 3 rotates relative to stator 30, each array will create succussions at a different frequency. By properly choosing different frequencies, a sum and difference interference pattern will result, creating a wide spectrum of frequencies. This spectrum of frequencies can be beneficial in many applications where unknown impurities in a host liquid need to be broken down and oxidized.

FIG. 4 illustrates a cross-sectional side view of an embodiment of a stator 30. For smaller diameter stators, it may be difficult to form the borehole 26 on the inside of stator 30. The embodiment of FIG. 4 uses an inner sleeve 54 and an outer sleeve 56. The boreholes 26 can be drilled, from the outside, of the inner sleeve 54. For each borehole 26 on the inner sleeve 54, a corresponding aligned orifice 24 is drilled on the outer sleeve 56. The inner sleeve 54 is then placed in, and secured to, the outer sleeve 56 to form the stator 30. Other methods, such as casting, could also be used to form the stator 30.

Figure 5A:
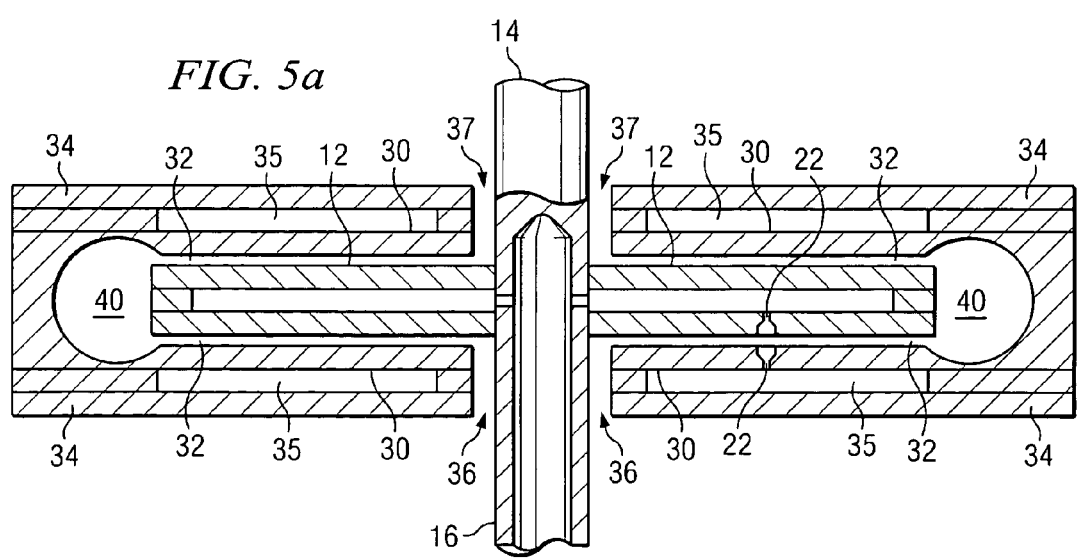
FIG. 5a illustrates a cross-section view of the rotor-stator assembly in a second embodiment of the invention.
Figure 5B:
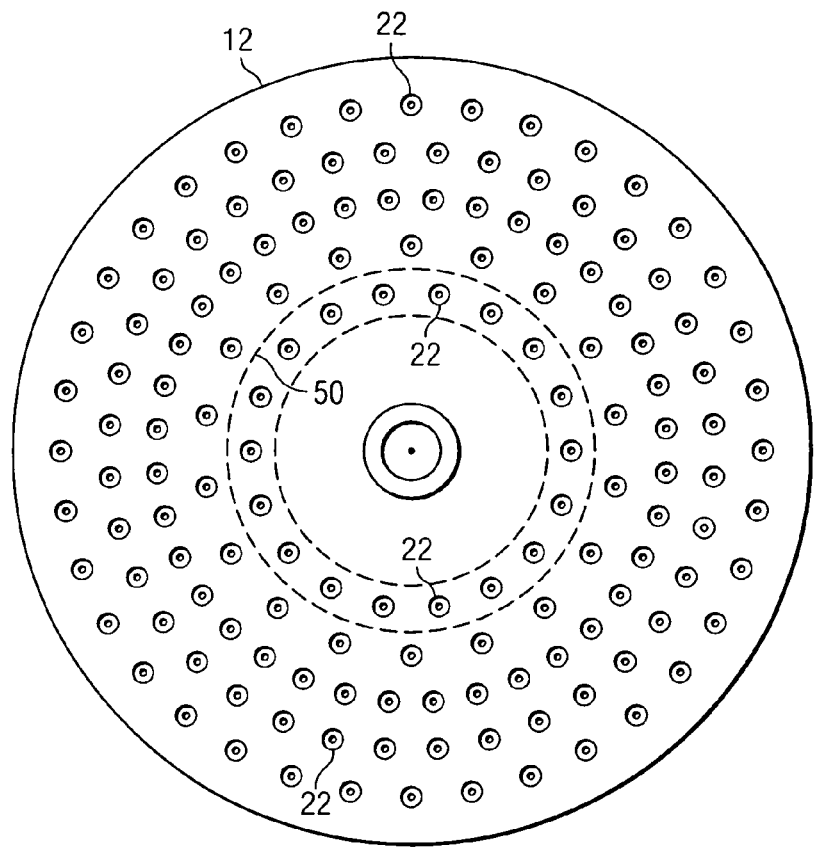
FIG. 5b illustrates a top view of the rotor in the second embodiment of the invention.
Figure 6:
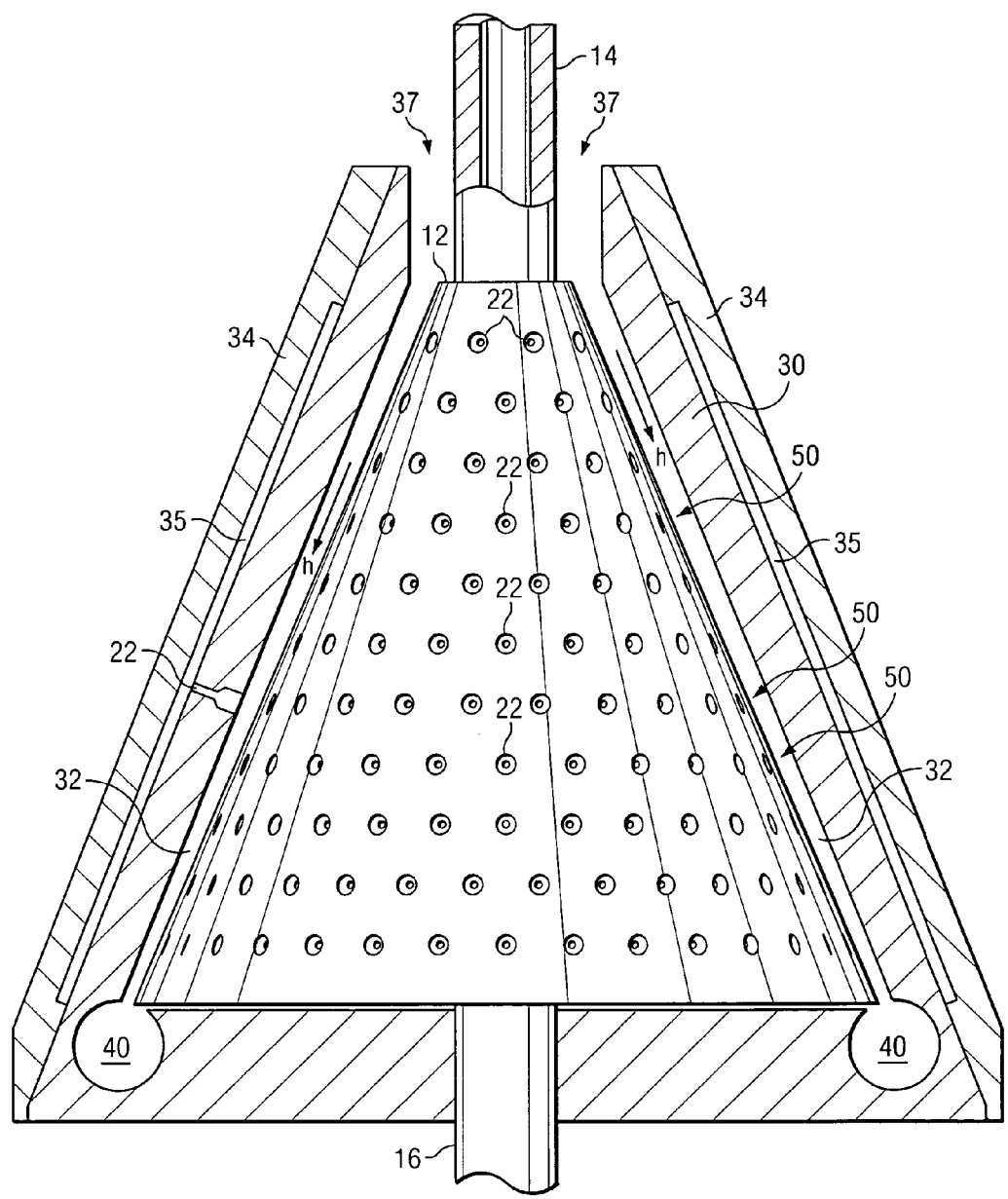
FIG. 6 illustrates a cut-away view of a third embodiment of the invention.

FIGS. 5a-b and 6 illustrate alternative embodiments of the diffuser 10. Where appropriate, reference numerals from FIG. 1 are repeated in these figures.

FIG. 5a illustrates an cross-sectional side view of an embodiment where the rotor 12 and stator 30 are disk shaped. FIG. 5b illustrates a top view of the disk shaped rotor 12. The stator 30 is formed above and below the rotor 12. Both the stator 12 and rotor 30 have a plurality of openings of the type described in connection with FIG. 1, which pass by each other as the rotor 12 is driven by the motor. As before, for each array 52, the stator 30 may have one opening more or less than the corresponding array 50 in rotor 12 in order to prevent simultaneous succussion at two openings within an array. The openings 22 can be of the same shape as shown in FIG. 1. A hollow shaft serves as the inlet 16 to the interior of the disk shaped rotor for the first infusion material. Similarly, an area 35 between the stator 30 and the housing 34 receives the second infusion material. As the host material flows in the channel 32 between the rotor 12 and the stator 30, it is subjected to the vortex generation at the openings 22, thereby causing a diffusion of the first and second materials with the host material. The infused host material passes to outlets 40.

FIG. 5b illustrates a top view of the rotor 12. As can be seen, a plurality of openings forms concentric arrays of openings on the rotor 12. Each array can, if desired, generate secussions at different frequencies. In the preferred embodiment, openings 22 would be formed on the top and bottom of the rotor 12. Corresponding openings would be formed above and below these openings on the stator 30.

FIG. 6 illustrates a cut away view of an embodiment of the invention where the rotor 12 has a conical shape. Both the stator 12 and rotor 30 have a plurality of openings of the type described in connection with FIG. 1, which pass by each other as the rotor 12 is driven by the motor. In addition to the openings around the circumference of the rotor 12, there could also be openings at the bottom of the conical shape, with corresponding openings in the portion of the stator 30 at the bottom. As before, for each array, the stator 30 may have one opening more or less than the rotor 12 in order to prevent simultaneous succussion at two openings 22 on the same array. A hollow shaft serves as the inlet 16 to the interior of the disk shaped rotor for the first infusion material. Similarly, an area 35 between the stator 30 and the housing 34 receives the second infusion material. As the host material flows between the rotor 12 and the stator 30, it is subjected to the vortex generation at the openings 22, thereby causing a diffusion of the first and second materials with the host material. The infused host material passes to outlets 40.

In the embodiments of FIGS. 5a-b and 6, because the arrays of openings 22 can be formed at increasing diameters, generation of multiple frequencies may be facilitated. It should be noted that any number of shapes could be used, including hemi-spherical and spherical shapes to realize the rotor 12 and stator 30.

The diffuser described herein can be used in a number of applications. Optimal opening size (for both the orifice 24 and borehole 26), width of channel 32, rotational speed and rotor/stator diameters may be dependent upon the application of the device.

As described above, the diffuser 10 may be used for water aeration. In this embodiment air or oxygen is used as both the first and second infusion materials. The air/oxygen is diffused into the wastewater (or other water needing aeration) as described in connection with FIG. 1. It has been found that the diffuser can increase the oxygenation to approximately 400% dissolved oxygen, with greater concentrations expected as parameters are optimized for this application. In tests which circulated approximately twenty five gallons of municipal water at ambient temperatures (initially having a reading of 84.4% dissolved oxygen) through the device for five minutes to achieve 390% dissolved oxygen content, the enhanced concentration of oxygen levels remained above 300% dissolved oxygen for a period of four hours and above 200% dissolved oxygen for over 19 hours. After three days, the dissolved oxygen content remained-above 134%. In these tests, frequencies of 169 kHz were used. The sizes of the openings were 0.030 inches for the orifice 24 and 0.25 inches for the borehole (with the boreholes 26 on the rotor having sloped sides). Cooler temperatures could significantly increase the oxygenation levels and the persistence.

Also for the treatment of wastewater, or for bio-remediation of other toxic materials, oxygen could be used as one of the infusion materials and ozone could be used as the other infusion material. In this case, the ozone would be used to oxidize hazardous structures in the host material, such as VOCs and dangerous microorganism. Further, as described above, a set of frequencies (as determined by the arrays of openings in the rotor 12 and stator 30) could be used to provide an destructive interference pattern which would break down many of the complex structures into smaller substructures. Alternatively, if the treatment was directed towards oxidation of a single known hazardous substance, it would be possible to use a single frequency which was known to successfully break down the structure. Conversely, a set of frequencies which result in a constructive interference pattern could be used to combine two or more compounds into a more complex and highly structured substance.

For producing potable water, ozone could be used as the first and second infusion material to break down and oxidize contaminants.

While the operation of the diffuser 10 has been discussed in connection with large applications, such as municipal wastewater remediation, it could also be used in household applications, such as drinking water purifiers, swimming pools and aquariums.

The diffuser could also be used for other applications where diffusion of a gas or liquid into another liquid changes the characteristics of the host material. Examples of such applications would include the homogenization of milk or the hydrogenation of oils. Other applications could include higher efficiencies in mixing fuel and gases/liquids resulting in higher fuel economy.

Figure 7A:
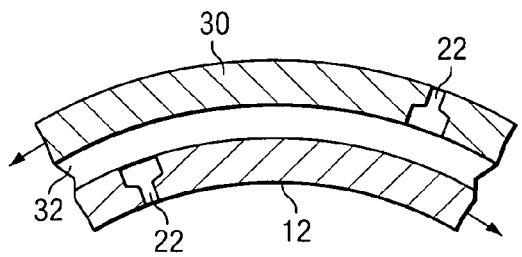
FIGS. 7a through 7h illustrate alternative embodiments for generating the diffusion.
Figure 7B:
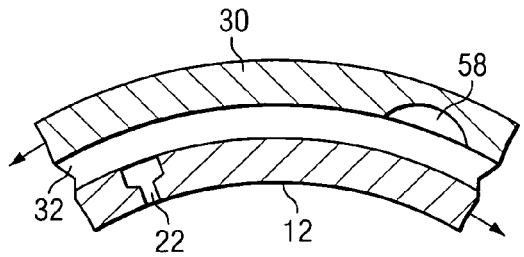

FIGS. 7a-b illustrate alternative embodiments for the rotor 12 and stator 30. In FIG. 7a, the "stator" 30 also rotates; in this case, the frequency of the succussions will be dependent upon the relative rotational speed between the rotor 12 and stator 30. In FIG. 7b, one of either the rotor 12 or stator 30 does not pass an infusion material through the component (in FIG. 7b only the rotor passes an infusion material); the component which does not pass an infusion material has its openings 22 replaced by cavities 58 to produce the turbulence. The cavities 58 could be shaped similarly to the boreholes 26 without the accompanying orifices 24.

Figure 7C:
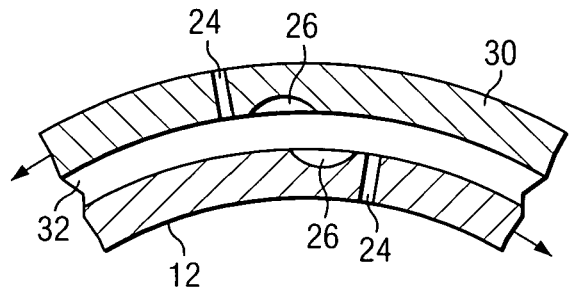

In FIG. 7c, the orifice 24 through which the infusion material is passed through the rotor 12 or stator 30 is positioned next to the borehole 26, rather than in the borehole 26 as in previous embodiments. It should be noted that the primary purpose of the borehole 26 is to disrupt the laminar flow of the host material along the surface of the rotor 12 and stator 30. The compression and rarefaction (decompression) of the host material causes the micro-cavitation, which provides the high degree of diffusion produced by the device. During decompression, voids (cavitation bubbles) are produced in the host material. The cavitation bubbles grow and contract (or implode) subject to the stresses induced by the frequencies of the succussions. Implosions of cavitation bubbles produce the energy which contribute to the high degree of diffusion of the infusion materials into the host material as it passes through the channel 32. Thus, so long as the infusion materials and the host material are mixed at the point where the cavitation and resultant shock waves are occurring, the diffusion described above will result.

Figure 7D:
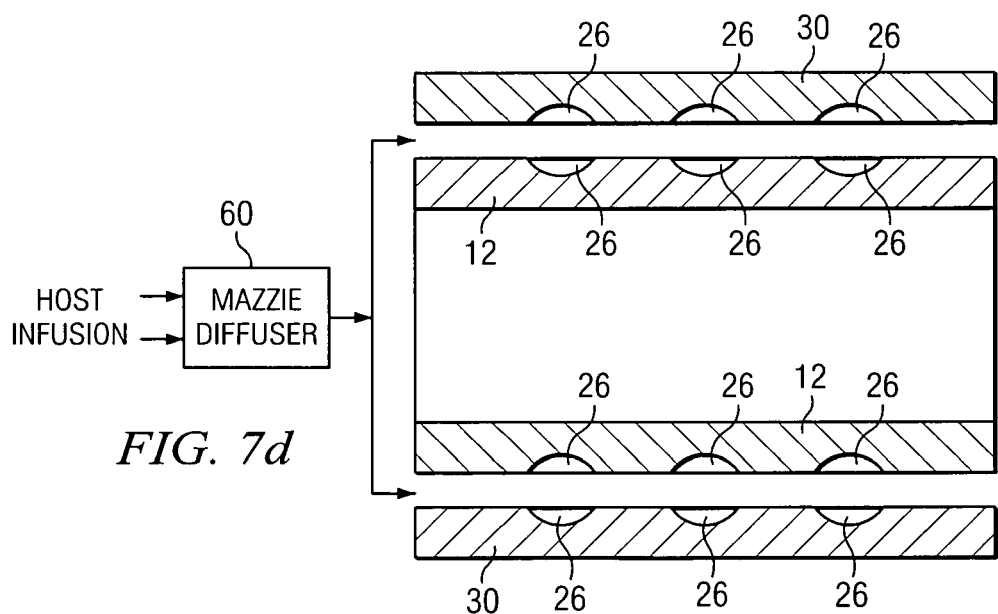

FIG. 7d illustrates an embodiment where the initial mixing of the host material and one or more infusion materials is performed outside of channel 32. In this embodiment a Mazzie diffuser 60 (or other device) is used to perform the initial mixing of the infusion material(s) and the host material. The mixture is input into the channel 32 between the rotor 12 and stator 30, wherein undergoes the compression/rarefaction cycles discussed above, which cause cavitation in the mixture, and is subjected to the frequency of the shock waves.

Figure 7E:
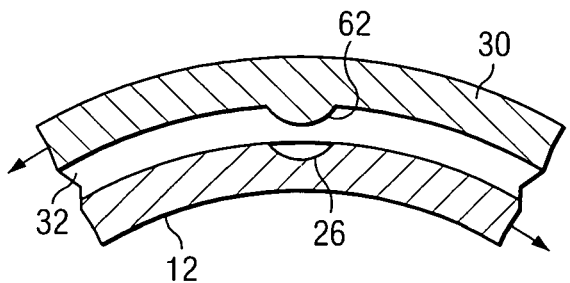
Figure 7F:
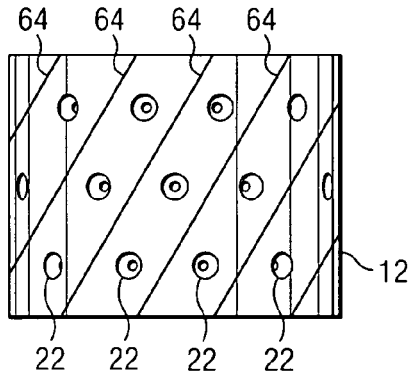

Further, the generation of the cavitation and shock waves could be performed using structures which differ from the boreholes 26 shown in the embodiments above. As stated above, the boreholes 26 are surface disturbances which impede the laminar flow of the host material along the sidewalls of the channel 32. In FIG. 7e, a protrusion, such as bump 62 could be used as a surface disturbance in place of or in conjunction with the boreholes 26. Shapes other than rounded shapes could also be used. As shown in FIG. 7f, grooves (or ridges) 64 could be formed in the rotor 12 and/or stator 30 to generate the cavitation and shock waves.

Figure 7G:
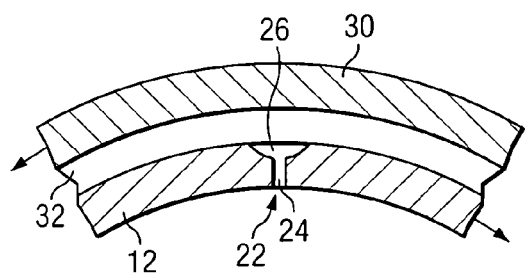

As stated above, not all applications require, or benefit from, the generation of shock waves at a particular frequency. Therefore, the rotor 12 or stator 30 could have the boreholes 26 (or other surface disturbances) arranged such that a white noise was produced, rather than a particular frequency. The structures used to create the cavitation need not be uniform; a sufficiently rough surface be formed on the rotor 12 or stator 30 will cause the cavitation. Additionally, as shown in FIG. 7g, it may not be necessary for both the surface of the rotor 12 and the surface of the stator 30 to create the cavitation; however, in most cases, operation of the device 10 will be more efficient if both surfaces are used.

Figure 7H:
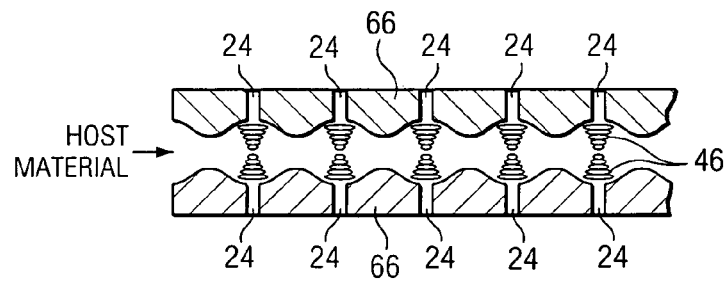

FIG. 7h illustrates a embodiment where the movement which causes the cavitation is provided by the host material (optionally with entrained infused material) rather than by relative motion of the rotor 12 and stator 30. In the embodiment of FIG. 7h, the channel 32 is formed between two walls 66 which are static relative to one another, one or both of which have surface disturbances facing the channel 32. The host material is driven through the channel at high speed using a pump or other device for creating a high speed flow. One or more infusion materials are input into the channel, either through orifices 24 or by mixing the host material with the infusion materials external to the channel. The high speed of the host material relative to the walls 66 causes the micro-cavitation and succussions described above.

As an example, one or more of the walls 66 could be a fine mesh, through which the infusion material(s) flows to mix with the host material in the channel 32. The surface disturbances in the mesh would cause micro-cavitations and succussions as the host material flows over the mesh at high speed. The frequency of the succussions would depend upon the resolution of the mesh and the speed of the host material. Once again, the infusion materials would diffuse into the host material at the molecular level at the micro-cavitation sites.

Figure 8A:
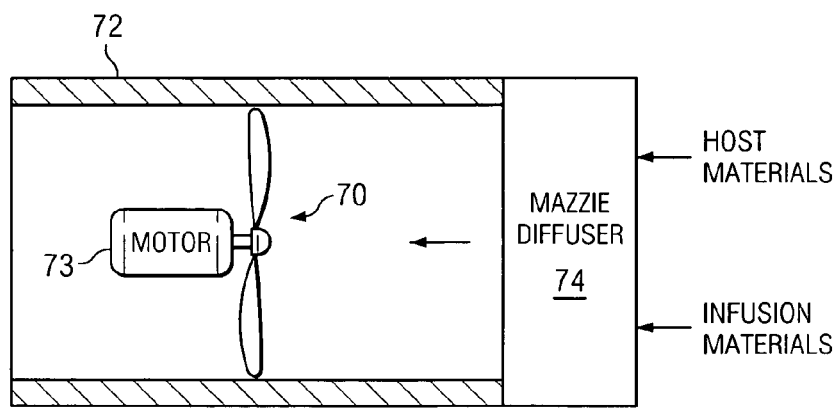
FIGS. 8a and 8b illustrate another alternative embodiment of the invention.
Figure 8B:
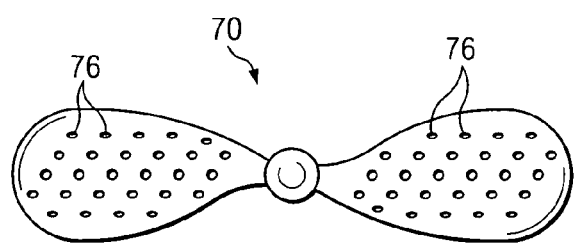

FIGS. 8a and 8b illustrate another embodiment, where a rotating member 70 is disposed within a conduit 72 and rotated by motor 73. The host material and infusion material(s) are mixed in the conduit 72 upstream from the rotating member 70 using a Mazzie diffuser 74 or other device. The rotating member could be, for example, propeller or auger shaped. On the surface of the rotating member 70 has one or more surface disturbances 76, such that the rotation of the rotating member 70 creates the micro cavitation discussed above, thereby causing a high degree of diffusion between the materials. The shape of the propeller blades and pattern of the surface disturbances 76 thereon could create the cavitation and succussion at a desired frequency for purposes described above. Further, the shape of the rotating device could draw the materials through the conduit.

The present invention provides significant advantages over the prior art. First, the micro-cavitations generated by the device allow diffusion to occur at a molecular level, increasing the amount of infusion material which will be held by the host material and the persistence of the diffusion. Second, the micro-cavitations and shock waves can be produced by a relatively simple mechanical device. Third, the frequency or frequencies of the shock wave produced by the device can be used in many applications, either to break down complex structures or to aid in combining structures. Fourth, the cavitations and shock waves can be produced uniformly throughout a material for consistent diffusion FIG. 9 illustrates a schematic representation of a method for producing oxygenated solutions using a diffuser constructed in accordance with the present invention. As shown here, the oxygenation system 90 comprises a supply or reservoir 91 of solution which is drawn up and circulated through tubing or other conduits by a pump 92 which subsequently delivers the solution to the diffuser 95. The diffuser 95 may be of any number of various embodiments including those set forth and described herein above in regard to FIGS. 1 through 8b. These diffusers significantly increase the amount of dissolved oxygen (DO) present in a solution by introducing gaseous oxygen to the solution using a diffuser having coaxial cylindrical or frusto conical stator and rotor components rotating discs or plates within a housing, Mazzie diffusers and impellers to create the desired cavitation and succussion desired for mixing of the solution and the gas. It should be noted that many of the solutions will be aqueous or water-based, but that the present invention is not limited to these solutions and is believed to work with other liquid mediums as well.

The diffuser 95 is supplied with solution by the pump 92 and combines this with gaseous oxygen from supply 94 and returns the oxygenated solution to the reservoir 91. The diffuser 95 may employ any number of possible embodiments for achieving diffusion including, but not limited to, micro-membrane, Mazzi injector, fine bubble, vortexing, electromolecular activation, or other methods known in the art. The oxygen supply 94 may be either a cylinder of compressed oxygen gas or a system for generating oxygen gas from the air or other chemical components. The oxygenated solution produced by the diffuser 95 is returned to the reservoir 91 and may be recirculated through the pump 92 and the diffuser 95 again to further attempt to increase the dissolved oxygen content or may be drawn off using the oxygenated solution outlet 97. Oxygenated solutions which are drawn off through the outlet 97 may be immediately put to use in various applications or alternatively may be packaged for later use.

The packaging step 98 may enclose oxygenated solutions in a variety of bottles, bags or other containers formed of plastic, metal, glass, or other suitable materials. Although the oxygenated solutions produced in accordance with the present invention have a relatively long shelf life under atmospheric conditions, the shelf life may be further extended by using packaging which hermetically seals the oxygenated solution. In this manner, dissolved oxygen which works its way out of the solution during storage will form a pressure head above the oxygenated solution and help to prevent the migration of dissolved oxygen out of the solution and back into the atmosphere. In one preferred embodiment of the present invention the oxygenated solution is packaged in an air tight container and the void space is filled with nitrogen or other inert gas at a pressure of greater than one atmosphere prior to sealing the container. The packaging step 98 may be used to produce bottles, bags, pouches, or other suitable containers for holding oxygenated solutions.

Using a diffusion system in accordance with the present invention it is possible to significantly increase the amount of dissolved gas in most liquids. The system and method allows oxygen to be dissolved stably at a high concentration with minimal passive loss. This system and method can be effectively used to dissolve a wide variety of gases at heightened percentages into a wide variety of liquids. By way of example only, a de-ionized water at room temperature that typically has levels of about 2-3 ppm (parts per million) of dissolved oxygen can achieve levels of dissolved oxygen ranging from about 8-70 ppm using the disclosed system and method. In accordance with a disclosed embodiment, an oxygenated water solution may be generated with levels of about 30-60 ppm of dissolved oxygen.

Figure 16:
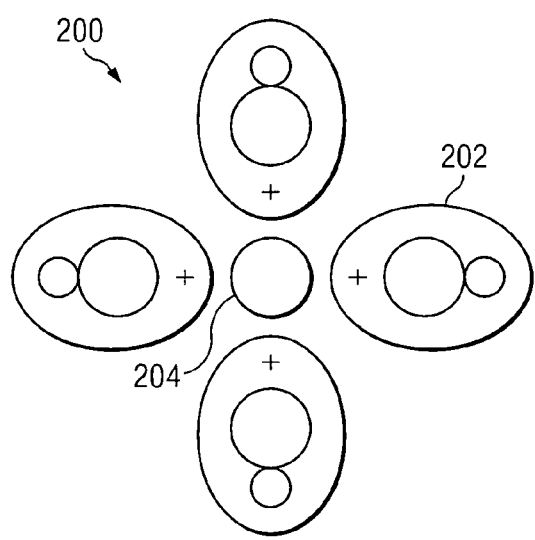
FIG. 16 illustrates a simplified nanocage.

With reference to FIG. 16, a simplified protonated water cluster forming a nanoscale cage 200 is shown. A protonated water cluster typically takes the form of $H^+(H_2O)_n$. Some protonated water clusters occur naturally, such as in the ionosphere. As a result of the disclosed processes, $OH^+$ molecules 202 bind to form a nanocage 200. Oxygen atoms 204 may be caught in the resulting nanocage 200. The chemistry of the semi-bound nanocage allows the oxygen 204 to remain dissolved for extended periods of time, far in excess of the natural evaporation rate of oxygen is unprocessed water. The process seems to produce large-scale protonated water clusters which form nanoscale cages 200 associated with the unique chain length of the hydrogen bond network of $n=21$ chain length. Under these geometric conditions, all the dangling —OH groups 202 arise from water molecules in similar binding sites forming a nano-cage 200. In this cage, oxygen 204 can be stably placed so that it does not passively diffuse out readily, even after storage periods as long as a year.

Other atoms or molecules, such as medicinal compounds, can be caged for sustained delivery purposes. The specific chemistry of the solution material and dissolved compounds depend on the interactions of those materials.

Oxygen is known or purported to have a wide variety of therapeutic and medicinal benefits. Among these benefits are faster healing and cell regrowth, improved resistance to disease, and increased energy or vitality. Increasing the level of dissolved oxygen in a liquid may increase the therapeutic and medicinal benefits of the liquid. These oxygenated liquids may be ingested, applied topically, injected or used in medicinal or therapeutic equipment or processes.

Other gases having therapeutic or medicinal benefits may similarly be dissolved at heightened levels into liquids to increase the therapeutic and medicinal benefits of the liquid. The synergy of a heightened level of a gas in a liquid may provide therapeutic or medicinal qualities.

Figure 17:
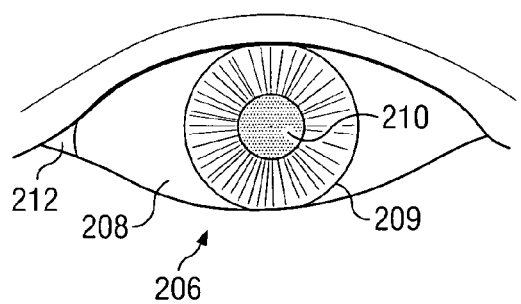
FIG. 17 illustrates an eye.

With reference to FIG. 17, an eye 206, particularly a human eye, is shown. Light is admitted through the pupil 210. The cornea 208 is the transparent gel-like coating of the eye 206 which covers the pupil 210 and iris 109. Tear ducts 212 at the corner of the eye 206 provide tears to continually moisten the cornea 208. People use contact lenses to correct refractive disorders of the eye 206 such as myopia, hyperopia and astigmatism. Lack of oxygen available to the cornea 206, which is covered by the contact lens can be major source of trouble for contact-lens wearers.

An oxygen-rich solution may be used to formulate an eye-drop that patients can use daily to optimize contact lens wear and thereby provide enhanced levels of oxygen to the contact-lens covered cornea 208. The aerated water produced in accordance with the disclosed systems and methods may be used in the manufacture, storage or care of contact lenses. Heightened levels of dissolved gas may increase the potency or safety of solutions used to store, clean, or moisten contact lenses.

The introduction and retention of oxygen to the contact lens material in the manufacture and use of contact lens manufacture and use. Because of the enriched dissolved oxygen content of the aerated water produced in accordance with the disclosed methods, the dissolved oxygen content of the contact lenses themselves as well as solutions used with contact lenses may enhanced. Saline solutions and other contact lens storage and wetting solutions may be produced using the aerated water.

Figure 18:
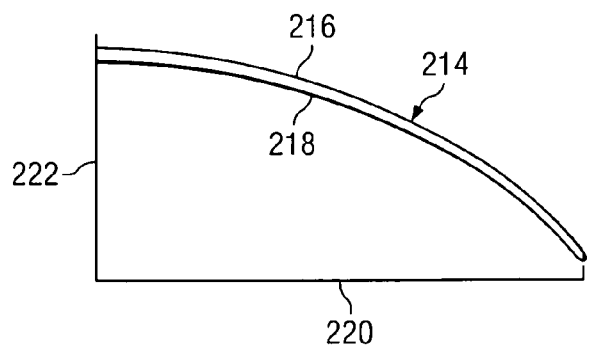
FIG. 18 illustrates a cut-away view of a contact lens.

With reference to FIG. 18, a half-side cut-away view of a contact lens 214 is shown. Contact lenses 214 are typically formed of soft polymer substances and may generally be divided into the categories of hydrophilic and hydrophobic lenses. Hydrophilic contact lenses 214 have a water content in excess of ten percent while hydrophobic lenses have water content of less than ten percent. The oxygen permeability of a contact lens 214 depends largely on the specific polymer used to form the lens. The oxygen permeability may be increased by using an aerated water to hydrate the polymer when the lens is created. Contact lenses may be made from a variety of commercially available materials, such as hydrophilic polymers (e.g., hydrogels) or poly(methyl methacrylate). A typical hydrogel polymer composition may consist of a reaction product of hydrophilic methacrylamide as well as an acrylic monomer, which may contain a zwitterionic monomer, such as a sulfobetaine, for example, N-(3-sulfopropyl)-N-methacryloxyethyl-N,N-dimethylammonium betaine (SPE), in order to improve the water-retention capability The contact lens 214 has a generally dome shape in its entirety. A contact lens 214 is typically worn on a cornea 208 of a lens wearer with its back surface 218 held in contact with a surface of the cornea 208 via tear fluid, as is well known in the art. The contact lens 214 has a center axis 222 approximately aligned with an optical axis of the lens, and is shaped as a solid of revolution about the center axis 222. For the sake of this geometrical feature of the contact lens 214, FIG. 18 shows only a symmetrical half of the contact lens 214 in its diametrical cross section.

More specifically described, the contact lens 214 includes a front surface 216 and the back surface 218. A central portion of the front surface 216 serves as a front optical zone, while a central portion of the back surface 218 serves as a back optical zone. These front and back optical zones have circular shapes in a plane view or as seen in a direction of the optical axis 222, and cooperate with each other to form an optical zone provided with a suitable degree of dioptric power for vision correction. These circular front and back optical zones have centers located on the center axis 222, and have different diameters.

Figure 19:
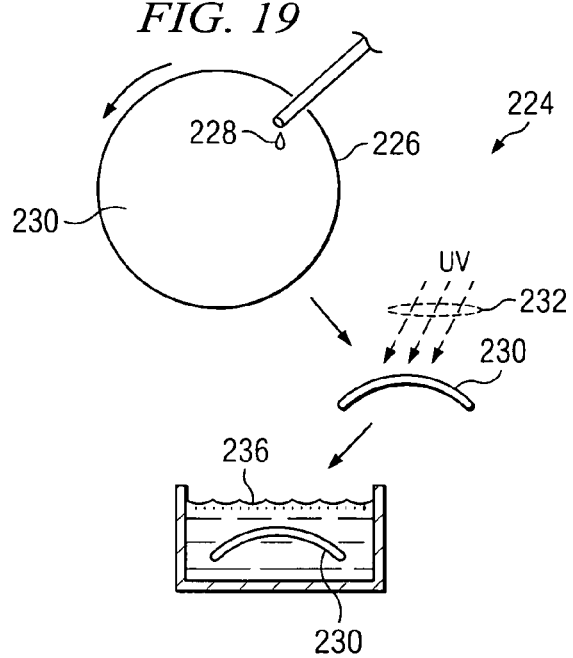
FIG. 19 illustrates a spin-cast process for forming a contact lens.

With reference to FIG. 19, a spin casting contact lens production process 224 including aerated water produced in accordance with the disclosed methods is shown. Liquid monomer 228 is injected into a spinning mold 226 to create the a contact lens 230 with a desired lens shape, thickness and size. The monomer 228 is distributed along the mold 226 according to centrifugal force, gravity and surface tension of the liquid 228. Slower rotations produce smaller diameters, thicker centers, flatter base curves and plus powers. The opposite is true for faster rotations. When the contact lens 230 with the desired lens parameters are obtained, UV light 232 is used to polymerize the monomer 228 into a solid lens 280. The lens 230 is then hydrated in a solution of oxygenated water 236 to its final state. By using an aerated water 236 produced in accordance with the disclosed methods for the hydration process, a contact lens 230 with an increased oxygen permeability can be formed.

Figure 20:
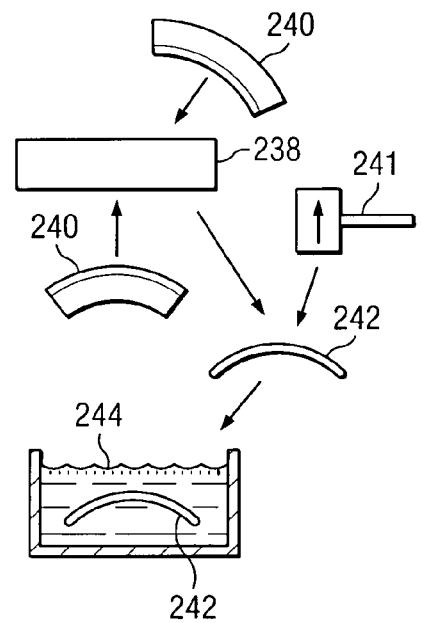
FIG. 20 illustrates a lathe cutting process for forming a contact lens.

With reference to FIG. 20, a lathe cutting contact lens production process including aerated water produced in accordance with the disclosed methods is shown. A polymerized soft lens material 238 in the rigid state is cut into the desired contact lens shape using a lathe 240. After cutting, the contact lens 242 is polished using a polishing tool 241 or chemical process. The polished contact lens 242 is then hydrated in a oxygenated hydrating solution 244 to create the final soft contact lens 242. The final soft contact lens 242 is hydrated with aerated water 244 to a specific water content, where the water content depends primarily on the polymer used.

Figure 21:
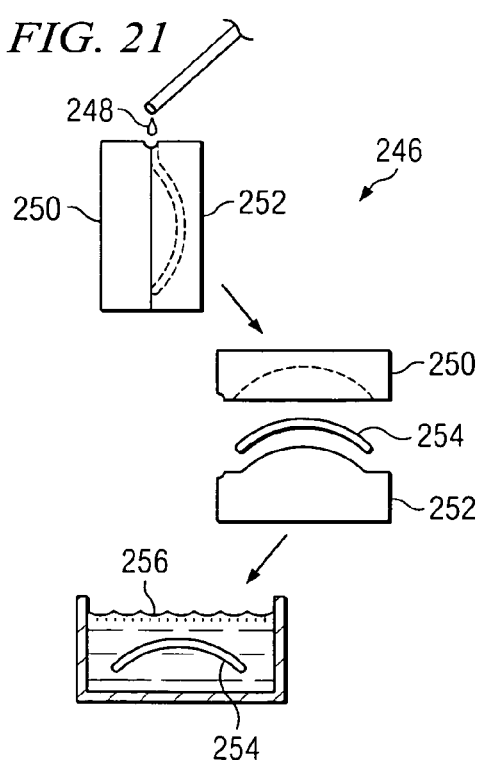
FIG. 21 illustrates a mold casting process for forming a contact lens.

With reference to FIG. 21, a cast molding contact lens production process 246 including aerated water produced in accordance with the disclosed methods is shown. A liquid monomer 248 is injected between two molds 250 and 252. In accordance with one cast molding technique, the monomer is polymerized into a solid form 254, which is then removed from the molds 250 and 252 and hydrated using aerated water 256. Another cast molding technique maintains the lens 254 in a liquid state during the hydration. This technique minimized variations in lens parameters caused by the hydration process. In accordance with another technique, an ultraviolet mask allows the monomer within a central clear zone to be polymerized. The extra monomer can be washed away. This process produces precise edges, decreasing complications caused by rough edges formed in other techniques.

FIGS. 10a through 10c illustrate various applications of oxygenated solutions for use as eye drops or contact lens solution. A variety of oxygenated liquids may be used as eye drops or contact lens solutions. Typical contact lens solutions are made for rinsing, cleaning and disinfecting the contact lenses.

As shown here the oxygenated solution 101 may be packaged in a bottle or other sealed container 100 provided with a pipette or eye dropper 102 for use in various ocular applications. One such application is that of an oxygenated saline solution for use as eye drops or artificial tears 103. The moisturizing eye drops 103 may be applied directly to the eye using the eye dropper 102 and applying two or three drops 103 per application directly to the eye 104 to alleviate dry eyes, redness, allergic reactions, and to provide additional moisture to the corneal region 208 of the eye.

In addition to oxygenating artificial tears to further supply oxygen to the corneal region 208 it is also possible to oxygenate other solutions such as various aqueous medications that might be applied topically to the surface of the eye 206. This may be particularly useful to patients that have recently had surgery performed on the cornea 208 or other areas of the eye 206 to improve vision (i.e., laser keratotomy, lasic, intralasic, and so forth) or to alleviate or lessen the effects of glaucoma.

It is common to prescribe various antibiotics, anti-inflammatories and pain relieving agents which are applied as drops in solution directly to the eye 206 itself following these and other surgical procedures. By using oxygenated aqueous solutions to increase oxygen diffusion into the surface of the eye 206, it is believed that faster healing may occur and that recovery time may be reduced.

Aging eyes 206 often become dry as a result of lowered tear production due to problems with the tear ducts 212. This problem is particularly marked in women. Seventeen percent of menopausal women us tear supplements to maintain stable vision and eye comfort. The most immediate patho-physiological problem produced by lower tear volume in these patients is the lack of dissolved oxygen from the air which has only a smaller volume to diffuse to reach the eye. Using an aerated solution with heightened levels of dissolved oxygen may be used with positive effects as a tear supplement.

Referring now to FIG. 10b another alternative application of an oxygenated solution in contact with the eye is shown. In addition to possible applications in the form of artificial tears or oxygenated medicines, the oxygenation process may also be applied to contact lens solutions such as saline solutions. A contact lens 106 is normally stored in a solution to keep the semipermeable polymer membrane moist and flexible. As shown here, a contact lens 106 which has been stored in an lens solution is normally disposed just above the cornea of the eye 104. The contact lens 106 will normally float just above the surface of the cornea on a layer of solution which may comprise the oxygenated saline solution 105 in which the lens has been stored. The oxygenated saline solution should increase the amount dissolved oxygen near the cornea of the eye and should help the eye to absorb greater amounts of oxygen that is usually possible with a contact lens in place.

FIG. 10c illustrates the storage of a pair of contact lenses 109 in a storage container 108. The storage container 108 has a pair of shallow recesses for containing an oxygenated contact lens solution 107 which is used to provide a suitable storage environment for the contact lenses 109. Contact lenses 109 are normally formed of thin polymer membranes which are semi-permeable to oxygen gas and which must be kept moist to retain their flexibility and other physical property characteristics. The contact lens solution 107 may be oxygenated using the disclosed processes. The solutions are typically a saline solution which is intended to mimic natural tears and which will be readily accepted by the body. However, the solution may further include various agents to help reduce the build up of proteins or other residues on the surface of the lens which may impair vision or cause some discomfort to the wearer.

Immediate application of the oxygen-rich solution is possible for enhancing biological tissue growth conditions of all cell lines, tissues and organ cultures. An oxygen-rich solution can be used in artificial blood and blood-perfusing medicinal procedures such as coronary bypass surgery and shock-trauma procedures. Similarly, oxygen-rich solutions may be used to perfuse solid organs, such as livers, kidneys, hearts, etc., in transit for transplantation and at the time of surgery. Use of oxygenated solutions produced in accordance with the disclosed embodiments may lead to longer storage time and better transplant results.

FIG. 11 illustrates a container and method of transporting or storing organs, organic samples, test subjects other living tissues using oxygenated solution. The storage system 110 comprises an oxygenated solution 112 which has been poured into a storage container 114 and holds a specified volume of oxygenated storage medium 116 containing an organ or other living tissues 118. The container 114 may be insulated or provided with a portable refrigeration unit (not shown) and may further include various impellers or other circulators for moving the oxygenated solution on and about all the surfaces of the living tissues 118 which are being stored or transported for transplantation. In this manner, it is believed that living tissues will be better preserved with less cell damage prior to transplantation.

FIG. 12 illustrates an alternative system for storing and transporting living tissues and organs. The system 120 comprises a container 121 holding an oxygenated storage medium 122 and living tissues 124 which is to be stored or transported for transplantation. The system 120 further comprises a circulation pump 125 which draws solution 122 and combines the solution with oxygen gas from the supply 126 using a diffuser 127 constructed in accordance with the present invention. The pump, diffuser, and other components of the transportation and storage system may be provided with a portable power supply in the form of one or more batteries 128 or a hydrogen fuel cell.

By storing and transporting organs and other living tissues 124 in an oxygenated storage medium 122, it is possible to reduce damage to cells and living tissues outside the body and to supply these tissues to transplantation candidates in a healthier condition. By using oxygenated solutions as a storage and transportation medium 122 it is possible to promote life and health in transplant recipients by introducing higher levels of dissolved oxygen, slowing down cell decomposition during storage and transportation, and further increasing the probability of a successful organ transplant.

The unique qualities of the liquids with high levels of stable dissolved gases produced in accordance with the disclosed embodiment make it possible to use the solution as a drug delivery device. Medicinal compounds such as peptides, as growth factors, anti-cancer agents, etc., antibiotics or any other suitable drugs may be introduced using the solution.

FIG. 13 shows a system for the delivery of intravenous fluids including medicines, plasma, or saline solution into a patient. As shown here, the system 130 comprises at least one intravenous solution bag 132 filled with an oxygenated saline solution or plasma 133 and optionally various medications in form 134. The medications in solution 134 may also be oxygenated in accordance with the present invention. The oxygenated solutions 133 and 134 may be mixed together at a single valve 135 and directed to an infusion pump 136 to be dispensed intravenously to the arm of the patient 138.

It is possible to oxygenate a plasma for use in the human body or other animals and that this may have application in the treatment of all forms of cancer or other medical diseases and anomalies. It is may be useful to oxygenate plasma to preserve it in useful condition when stored for extended periods of time. Additionally, it is possible to oxygenate other intravenous solutions which are to be injected via a needle or plasma into the human body. These oxygenated medicines, serums, drugs or other liquids may be used to treat all forms of cancer and other medical diseases and anomalies. It is also believed that by using oxygenated saline solutions, plasmas, or other medicines it is possible to increase the amount of oxygen that reaches living tissues and to speed the healing process.

FIG. 14 illustrates a system using hydrotherapy or other topical applications for introducing oxygenated solutions to the body. The system 140 comprises a tub 142 or whirlpool bath which may be filled with oxygenated solution 144. In one embodiment the patient 146 is either partially or wholly immersed in the oxygenated solution for topical treatment of various maladies. It is believed that using hydrotherapy or topical application of oxygenated solution it is possible for the patient to receive an increased blood oxygen level and should hopefully lead to a healthier, better feeling patient with increased energy and vitality.

FIG. 15 illustrates an alternative embodiment of a pump and diffuser system constructed in accordance with the present invention. The system 150 comprises a check valve 151 for introducing a solution to be oxygenated into the system. The solution passes though the wall of the housing 152 and into the pump chamber 153. A pumping action may be achieved by using a flexible diaphragm 154 which moves up and down. As the diaphragm 154 moves outward, solution is first drawn into the pump chamber 153 by a slight suction. As the diaphragm is drawn inward, solution is pushed upward and through an second check valve mechanism 155. This valve mechanism 155 may be a selectively permeable polymer membrane, as shown here. In one embodiment, the polymer membrane may be a liquid crystalline material that is activated by passing an electrical current.

As the solution is forced out of the pump chamber 153 and through the membrane 155, it moves into a liquid filtration and aeration material 157. The filtration and aeration material is held in place by the upper portion of the housing or top cover 158. Various gases, usually oxygen, may then be introduced into the solution through an entry port 156. After the solution has mixed with and dissolved a desired amount of gas it is then pushed out of the pump and diffuser system through the exit port 159. It is notable that this particular embodiment of the present invention may be quite compact. Accordingly, it should be possible to incorporate this devise into portable devices and into other systems requiring various solutions containing dissolved gases.

Figure 22:
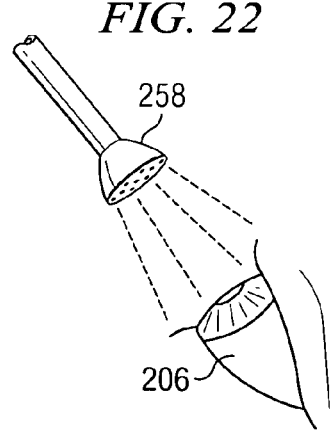
FIG. 22 illustrates an eyewash station.

Aerated water produced in accordance with the disclosed embodiment may also be used to decontaminate or wash away contaminants from a person, animal or object. Because of the higher levels of oxygen in the water, some contaminants can be more thoroughly cleaned away by the aerated water, while providing high levels of oxygen to the surface being cleaned, which may be particularly therapeutic where the surface is an organic surface such as the eye. With reference to FIG. 22, an eyewash station 258 using aerated water may be used to cleanse a contaminated eye 206.

It will be appreciated by those skilled in the art having the benefit of this disclosure that this invention provides a method and system of providing an ordered liquid with dissolved gas for therapeutic and medicinal uses. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A method of therapeutically applying dissolved oxygen comprising:

diffusing oxygen gas into an aqueous solution to produce an oxygen enriched solution; and applying the oxygen enriched solution topically to be absorbed through the skin, wherein diffusing the oxygen gas into the aqueous solution comprises flowing the aqueous solution from a first inlet substantially without interruption into a first end of a channel formed between a first side of a first member and a first side of a second member;

flowing the aqueous solution through the channel over surface disturbances comprising at least one of depressions or protrusions and a plurality of second inlets formed therein in at least one of the first side of the first member and the first side of the second member and thereby generating a plurality of vortexes in the first material, the surface disturbances comprising said plurality of second inlets formed therein in the second member, the aqueous solution flowing to an outlet proximate to a second end of the channel;

introducing the oxygen gas proximate to the plurality of vortexes in the first material through said plurality of second inlets in the second member, the plurality of second inlets being arranged in a pattern including at least two rows of spaced apart second inlets and located between the first inlet and the outlet thereby causing the aqueous solution to flow past the plurality of second inlets, the plurality of vortexes diffusing the oxygen gas within the aqueous solution; and causing the aqueous solution with the oxygen gas diffused therein to exit the channel through the outlet.

2. The method according to claim 1, wherein the oxygen enriched solution is applied in a hydrotherapy bath.

3. The method according to claim 1, wherein the oxygen enriched solution is applied as drops to the cornea of the eye.

* * * * *

UNITED STATES PATENT AND TRADEMARK OFFICE
CERTIFICATE OF CORRECTION

PATENT NO. : 7,654,728 B2  Page 1 of 1
APPLICATION NO. : 10/877106
DATED : February 2, 2010
INVENTOR(S) : Wood et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 661 days.

Signed and Sealed this

Twenty-third Day of November, 2010

David J. Kappos
*Director of the United States Patent and Trademark Office*